US012177061B2

(12) United States Patent
Ly et al.

(10) Patent No.: US 12,177,061 B2
(45) Date of Patent: Dec. 24, 2024

(54) SERVICE LAYER RESOURCE MANAGEMENT FOR GENERIC INTERWORKING AND EXTENSIBILITY

(71) Applicant: Convida Wireless, LLC, Wilmington, DE (US)

(72) Inventors: Quang Ly, North Wales, PA (US); Dale N. Seed, Allentown, PA (US); William Robert Flynn, IV, Schwenksville, PA (US); Catalina M. Mladin, Hatboro, PA (US); Chonggang Wang, Princeton, NJ (US); Rocco Di Girolamo, Laval (CA); Zhuo Chen, Claymont, DE (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 18/461,965

(22) Filed: Sep. 6, 2023

(65) Prior Publication Data
US 2024/0080235 A1 Mar. 7, 2024

Related U.S. Application Data

(63) Continuation of application No. 17/568,162, filed on Jan. 4, 2022, now Pat. No. 11,799,711, which is a
(Continued)

(51) Int. Cl.
*G06F 9/50* (2006.01)
*H04L 41/02* (2022.01)
(Continued)

(52) U.S. Cl.
CPC .......... *H04L 41/02* (2013.01); *G06F 9/5061* (2013.01); *H04L 67/141* (2013.01);
(Continued)

(58) Field of Classification Search
CPC ..... H04L 67/146; H04L 69/329; H04L 41/02; H04L 67/53; H04L 67/141; G06F 9/5061
See application file for complete search history.

(56) References Cited

U.S. PATENT DOCUMENTS 6,714,987 B1 * 3/2004 Amin ................. H04L 65/80
                                                 709/200
6,910,074 B1 * 6/2005 Amin ................. H04L 12/2872
                                                 709/227
(Continued)

FOREIGN PATENT DOCUMENTS

CN    102576354 A    7/2012
CN    105580396 A    5/2016
(Continued)

OTHER PUBLICATIONS

DVB Organization "Interwroking with the Service Layer v2.docx", DVB, Digital Video Broadcasting, Jan. 23, 2012, 3 pages.
(Continued)

*Primary Examiner* — Glenford J Madamba
*Assistant Examiner* — Hassan A Khan
(74) *Attorney, Agent, or Firm* — BakerHostetler

(57) ABSTRACT

Lightweight, dynamic mechanisms are provided to support service layer interworking and resource extensibility. For example, one mechanism disclosed herein comprises defining a new service layer (SL) resource definition registration procedure that allows for specifying custom attributes of service layer resources to represent third party technology resources. A second mechanism disclosed herein comprises defining a new SL data model mapping registration procedure to map service layer resources to third party data models and to provide a new interworked retargeting indicator to the service layer. Further, a third mechanism disclosed herein comprises defining a SL generic interworking procedure to intelligently retarget requests toward inter-
(Continued)

worked resources based on the interworked retargeting indicator provided by the data model mapping.

16 Claims, 30 Drawing Sheets

Related U.S. Application Data continuation of application No. 15/726,956, filed on Oct. 6, 2017, now Pat. No. 11,240,093.

(60) Provisional application No. 62/405,534, filed on Oct. 7, 2016.

(51) Int. Cl.
    *H04L 67/141* (2022.01)
    *H04L 67/146* (2022.01)
    *H04L 67/53* (2022.01)
    *H04L 69/329* (2022.01)

(52) U.S. Cl.
    CPC ............ *H04L 67/146* (2013.01); *H04L 67/53* (2022.05); *H04L 69/329* (2013.01)

(56) References Cited

U.S. PATENT DOCUMENTS

| | | | | |
|---|---|---|---|---|
| 7,584,274 | B2* | 9/2009 | Bond | G06F 9/5072 709/227 |
| 8,234,702 | B2* | 7/2012 | Maes | H04L 67/14 726/13 |
| 8,788,646 | B2* | 7/2014 | Song | H04L 47/10 709/224 |
| 10,015,167 | B1* | 7/2018 | O'Kennedy | H04L 63/062 |
| 10,021,549 | B2* | 7/2018 | Lu | H04W 4/70 |
| 11,799,711 | B2* | 10/2023 | Ly | H04L 67/53 |
| 2004/0249927 | A1* | 12/2004 | Pezutti | H04L 41/5006 709/223 |
| 2007/0171921 | A1* | 7/2007 | Wookey | H04L 63/10 707/E17.013 |
| 2007/0209042 | A1 | 9/2007 | Mullan et al. | |
| 2008/0021918 | A1* | 1/2008 | Rao | G06F 16/958 707/999.102 |
| 2008/0072307 | A1* | 3/2008 | Maes | H04L 67/56 726/12 |
| 2008/0285466 | A1* | 11/2008 | Salam | H04L 41/0226 370/242 |
| 2009/0041033 | A1* | 2/2009 | Marucheck | H04L 45/60 370/400 |
| 2010/0042720 | A1* | 2/2010 | Stienhans | G06F 9/5072 709/226 |
| 2010/0332262 | A1* | 12/2010 | Horvitz | G06F 9/5072 705/26.1 |
| 2011/0016214 | A1* | 1/2011 | Jackson | G06F 9/505 718/101 |
| 2011/0119368 | A1* | 5/2011 | Song | H04L 47/10 709/223 |
| 2011/0119391 | A1* | 5/2011 | Maes | H04L 65/1046 709/230 |
| 2011/0138064 | A1* | 6/2011 | Rieger | G06F 16/9577 707/715 |
| 2011/0258305 | A1* | 10/2011 | Chen | H04L 41/20 709/223 |
| 2012/0072910 | A1* | 3/2012 | Martin | G06F 9/45533 718/1 |
| 2012/0096365 | A1* | 4/2012 | Wilkinson | G06F 9/468 715/740 |
| 2012/0137005 | A1 | 5/2012 | Behrendt et al. | |
| 2012/0179817 | A1* | 7/2012 | Bade | G06F 9/45558 709/225 |
| 2012/0258674 | A1* | 10/2012 | Livet | H04W 76/10 455/73 |
| 2012/0290643 | A1* | 11/2012 | Fok Ah Chuen | H04W 4/02 709/203 |
| 2012/0324069 | A1* | 12/2012 | Nori | G06F 9/5066 709/222 |
| 2013/0041997 | A1* | 2/2013 | Li | H04W 4/70 709/223 |
| 2013/0060945 | A1* | 3/2013 | Allam | G06F 9/455 709/226 |
| 2013/0067090 | A1* | 3/2013 | Batrouni | H04L 67/1097 709/226 |
| 2013/0103842 | A1 | 4/2013 | Seed et al. | |
| 2013/0128777 | A1* | 5/2013 | Garcia Azorero | H04W 8/18 370/259 |
| 2013/0188515 | A1* | 7/2013 | Pinheiro | H04L 41/12 370/254 |
| 2013/0203394 | A1 | 8/2013 | Dong et al. | |
| 2013/0219064 | A1* | 8/2013 | Zhang | H04W 4/00 709/225 |
| 2013/0246784 | A1* | 9/2013 | Zhang | H04W 12/122 713/153 |
| 2014/0033074 | A1* | 1/2014 | Thibaux | H04L 67/535 715/753 |
| 2014/0126581 | A1* | 5/2014 | Wang | H04W 4/50 370/431 |
| 2014/0169168 | A1* | 6/2014 | Jalan | H04L 47/125 370/235 |
| 2014/0221032 | A1* | 8/2014 | Yang | H04W 72/04 455/509 |
| 2014/0244838 | A1* | 8/2014 | Ryu | H04W 4/38 709/224 |
| 2014/0330952 | A1* | 11/2014 | Starsinic | H04L 65/1069 709/223 |
| 2014/0349614 | A1* | 11/2014 | Starsinic | H04W 12/04 455/411 |
| 2014/0359131 | A1* | 12/2014 | Seed | H04L 67/1031 709/226 |
| 2014/0369251 | A1* | 12/2014 | Zhang | H04L 12/1877 370/312 |
| 2015/0029894 | A1* | 1/2015 | Lu | H04W 4/70 370/259 |
| 2015/0033311 | A1* | 1/2015 | Seed | H04L 67/14 726/7 |
| 2015/0033312 | A1* | 1/2015 | Seed | H04L 67/141 709/227 |
| 2015/0127795 | A1* | 5/2015 | Jagana | H04L 63/20 709/223 |
| 2015/0296470 | A1* | 10/2015 | Kim | H04L 63/0876 455/435.2 |
| 2016/0007137 | A1* | 1/2016 | Ahn | H04L 67/12 370/254 |
| 2016/0029190 | A1* | 1/2016 | Rattner | H04W 88/16 455/414.4 |
| 2016/0065417 | A1* | 3/2016 | Sapuram | H04L 41/50 709/223 |
| 2016/0085577 | A1* | 3/2016 | Gray | H04L 49/70 718/1 |
| 2016/0191295 | A1 | 6/2016 | Dong et al. | |
| 2016/0192111 | A1 | 6/2016 | Choi et al. | |
| 2016/0197851 | A1 | 7/2016 | Jaisinghani | |
| 2016/0204993 | A1* | 7/2016 | Chen | H04L 67/02 709/223 |
| 2016/0226847 | A1* | 8/2016 | Bone | H04L 63/0442 |
| 2016/0226955 | A1* | 8/2016 | Moorthi | G06F 9/5066 |
| 2016/0227371 | A1* | 8/2016 | Wang | H04W 4/70 |
| 2016/0242043 | A1 | 8/2016 | Dong et al. | |
| 2016/0302069 | A1* | 10/2016 | Kim | H04W 4/70 |
| 2017/0064488 | A1* | 3/2017 | Granzow | H04W 4/70 |
| 2018/0102934 | A1* | 4/2018 | Ly | H04L 67/146 |
| 2018/0199175 | A1* | 7/2018 | Wu | H04W 8/24 |
| 2018/0219646 | A1* | 8/2018 | Del Carpio Vega | H04L 1/1607 |
| 2018/0270211 | A1* | 9/2018 | O'Kennedy | H04L 63/0823 |
| 2018/0310141 | A1* | 10/2018 | Yin | H04W 4/08 |

(56) References Cited

U.S. PATENT DOCUMENTS

| | | | | |
|---|---|---|---|---|
| 2018/0317069 | A1* | 11/2018 | Lu | H04L 67/288 |
| 2022/0131738 | A1* | 4/2022 | Ly | G06F 9/5061 |

FOREIGN PATENT DOCUMENTS

| | | | |
|---|---|---|---|
| CN | 105766005 | A | 7/2016 |
| JP | 2016-519445 | A | 6/2016 |
| JP | 2016-533081 | A | 10/2016 |
| JP | 2017-531389 | A | 10/2017 |
| KR | 10-2013-0053202 | A | 5/2013 |
| KR | 10-2015-0135769 | A | 12/2015 |
| WO | 2007/099520 | A2 | 9/2007 |
| WO | 2015/143086 | A1 | 9/2015 |
| WO | 2016/014516 | A1 | 1/2016 |
| WO | 2016/044581 | A1 | 3/2016 |
| WO | 2016/153997 | A1 | 9/2016 |

OTHER PUBLICATIONS

Husain et al., "Interworking Architecture Between oneM2M Service Layer and Underlying Networks" 2014 IEEE Globecom Workshops, Dec. 8, 2014, pp. 636-642.

Liu Qiang, "Key Technologies and application of Internet of Things", Computer Science, 2010, vol. 37, Issue 6, pp. 1-5.

OMA Open Mobile Alliance "Lightweight Machine to Machine Technical Specification Approved Version 1.0" Feb. 8, 2017, 138 pages.

OneM2M Technical Specification TS-0001 V 2.10.0 "Functional Architecture", Oct. 2016, 422 pages.

OneM2M Technical Specification TS-0004-2.7.1 "Service Layer Core Protocol Specification" Aug. 30, 2016, 331 pages.

OneM2M Technical Specification TS-0005-V1.4.1, Management Enablement (OMA), Feb. 29, 2016, 60 pages.

OneM2M Technical Specification TS-0006-V1.1.4 Management Enablement (BBF), Feb. 29, 2016, 43 pages.

OneM2M Technical Specification TS-0014-V2.0.0, "LWM2M Interworking", Aug. 30, 2016, 36 pages.

OneM2M Technical Specification TS-0021-V2.0.0, "oneM2M and AllJoyn Interworking", Aug. 30, 2016, 62 pages.

OneM2M Technical Specification TS-0024-V2.0.0, "OIC Interworking", Aug. 30, 2016, 18 pages.

Yun et al., "Demo: Towards Global Interworking of IoT Systems—oneM2M Interworking Proxy Entities", SenSys '15: Proceedings of the 13th ACM Conference on Embedded Networked Sensor Systems, 2015, pp. 473-474.

Zhang, "Internet of things service support, system research and implementation", Jan. 15, 2013, pp. 1138-1240.

* cited by examiner

```
<xs:schema xmlns="http://www.w3.org/2001/XMLSchema" targetNamespace="http://www.one2m.org/xml/protocols"
xmlns:m2m="http://www.one2m.org/xml/protocols" elementFormDefault="unqualified" attributeFormDefault="unqualified"
xmlns:xs="http://www.w3.org/2001/XMLSchema">

<xs:include schemaLocation="CDT-commonTypes-v2_2_0.xsd" />
<xs:include schemaLocation="CDT-subscriptions-v2_2_0.xsd" />

<xs:element name="memory">
  <xs:complexType>
    <xs:complexContent>
      <!-- Inherit Common Attributes from data type "mgmtResource" -->
      <xs:extension base="m2m:mgmtResource">
        <!-- Resource Specific Attributes -->
        <xs:sequence>
          <xs:element name="memAvailable" type="xs:unsignedLong" />
          <xs:element name="memTotal" type="xs:unsignedLong" />

<!-- Child Resources -->
          <xs:choice minOccurs="0" maxOccurs="1">
            <xs:element name="childResource" type="m2m:childResourceRef" maxOccurs="unbounded" />
            <xs:element ref="m2m:subscription" maxOccurs="unbounded" />
          </xs:choice>
        </xs:sequence>
      </xs:extension>
    </xs:complexContent>
  </xs:complexType>
</xs:element>
```

FIG. 3A

```
<xs:element name="memoryAnnc">
  <xs:complexType>
    <xs:complexContent>
      <!-- Inherit Common Attributes from data type "announcedMgmtResource" -->
      <xs:extension base="m2m:announcedMgmtResource">
        <!-- Resource Specific Attributes -->
        <xs:sequence>
          <xs:element name="memAvailable" type="xs:unsignedLong" minOccurs="0" />
          <xs:element name="memeTotal" type="xs:unsignedLong" minOccurs="0" />

<!-- Child Resources -->
          <xs:choice minOccurs="0" maxOccurs="1">
            <xs:element name="childResource" type="m2m:childResourceRef" maxOccurs="unbounded" />
            <xs:element ref="m2m:subscription" maxOccurs="unbounded" />
          </xs:choice>
        </xs:sequence>
      </xs:extension>
    </xs:complexContent>
  </xs:complexType>
</xs:element>
</xs:schema>
```

FIG. 3B

```xml
<?xml version="1.0" encoding="UTF-8"?>
<definition>
    <!-- Resource Definition Information -->
    <resourceInfo>
        <resName value="dmServerInfo" />
        <resType value="mgmtObj" />
        <resVersion value="1.3" />
        <resShortName value="lmlsi" />
        <resLabel value="lwm2m:1" />
        <resLocations>
            <value>/cseBase/node</value>
        </resLocations>
    </resourceInfo>
    <!-- Resource Attributes -->
    <xs:schema xmlns="http://www.w3.org/2001/XMLSchema" targetNamespace="http://www.one2m.org/xml/protocols"
        xmlns:m2m="http://ww.one2m.org/xml/protocols" elementFormDefault="unqualified"
        attributeFormDefault="unqualified" xmlns:xs="http://www.w3.org/2001/XMLSchema" >
        <xs:include schemaLocation="CDT-commonTypes-v1_3_xsd" />
        <xs:include schemaLocation="CDT-sub-v1_3_0.xsd" />
        <xs:element name="dmServerInfo" >
            <xs:complexType>
                <xs:complexContent>
                    <!-- Inherit common attributes from mgmtResource -->
                    <xs:extension base="m2m:mgmtResource" >
                        <xs:sequence>
```

FIG. 16A

```
<!-- Resource Specific Attributes -->
<xs:element name="shortServerID" type="xs:nonNegativeInteger" minOccurs="0" />
<xs:element name="lifetime" type="xs:nonNegativeInteger" minOccurs="0" />
<xs:element name="defMinPeriod" type="xs:nonNegativeInteger" minOccurs="0" />
<xs:element name="defMaxPeriod" type="xs:nonNegativeInteger" minOccurs="0" />
<xs:element name="disable" type="xs:boolean" minoccurs="0" />
<xs:element name="disableTimeout" type="xs:nonNegativeInteger" minOccurs="0" />
<xs:element name="storeNotifOffline" type="xs:string" minOccurs="0" />
<xs:element name="bindingMode" type="xs:string" minOccurs="0" />
<xs:element name="triggerUpdateReg" type="xs:boolean" minOccurs="0" />
<!-- Child Resources -->
<xs:choice minOccurs="0" maxOccurs="1" >
    <xs:element name="ch" type="m2m:childResourceRef" maxOccurs="unbounded" />
    <xs:element ref="m2m:sub" maxOccurs="unbounded" />
</xs:choice>
</xs:sequence>
</xs:extension>
</xs:complexContent>
</xs:complexType>
</xs:element>
<xs:element name="dmServerInfoAnnc"> ... </xs:element>
</xs:schema>
<!-- Activation Criteria -->
<activationCriteria>
    <checks>
        <authorization>yes</authorization>
        <wellFormed>yes</wellFormed>
        <validation>yes</validation>
    </checks>
</activationCriteria>
</definition>
```

FIG. 16B

```xml
<?xml version="1.0" encoding="UTF-8"?>
<mapping>
  <xs:element name="dmServerInfo">
    <xs:sequence>
      <!-- Resource Specific Attributes -->
      <xs:element name="shortServerID" targetURI="/1/*/0" restartLevel="0,null" />
      <xs:element name="lifetime" targetURI="/1/*/1" restartLevel="3,/1/*/1" />
      <xs:element name="defMinPeriod" targetURI="/1/*/2" restartLevel="2,/1/*/2" />
      <xs:element name="defMaxPeriod" targetURI="/1/*/3" restartLevel="2,/1/*/3" />
      <xs:element name="disable" targetURI="/1/*/4" restartLevel="1,null" />
      <xs:element name="disableTimeout" targetURI="/1/*/5" restartLevel="2,/1/*/5" />
      <xs:element name="storeNotifOffline" targetURI="/1/*/6" restartLevel="2,/1/*/6" />
      <xs:element name="bindingMode" targetURI="/1/*/7" restartLevel="2,/1/*/7" />
      <xs:element name="triggerUpdateReg" targetURI="/1/*/8" restartLevel="1,null" />
    </xs:sequence>
  </xs:element>
</mapping>
```

FIG. 17

```xml
<?xml version="1.0" encoding="UTF-8"?>
<mapping>
    <xs:element name="dmServerInfo">
        <xs:sequence>
            <!-- Resource Specific Attributes -->
            <xs:element name="shortServerID" targetURI="/1/*/0" restartLevel="0" />
            <xs:element name="lifetime" targetURI="/1/*/1" restartLevel="0" />
            <xs:element name="defMinPeriod" targetURI="/1/*/2" restartLevel="1" />
            <xs:element name="defMaxPeriod" targetURI="/1/*/3" restartLevel="1" />
            <xs:element name="disable" targetURI="/1/*/4" restartLevel="1" />
            <xs:element name="disableTimeout" targetURI="/1/*/5" restartLevel="1" />
            <xs:element name="storeNotifOffline" targetURI="/1/*/6" restartLevel="1" />
            <xs:element name="bindingMode" targetURI="/1/*/7" restartLevel="1" />
            <xs:element name="triggerUpdateReg" targetURI="/1/*/8" restartLevel="1" />
        </xs:sequence>
    </xs:element>
</mapping>
```

FIG. 18

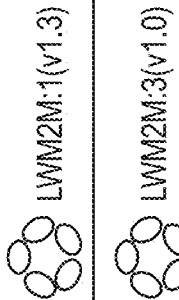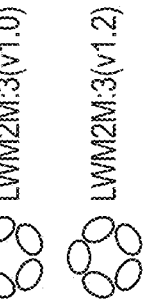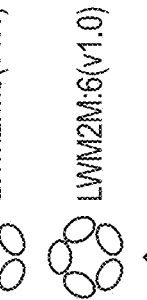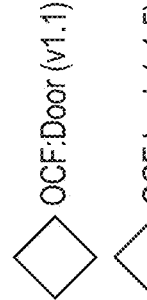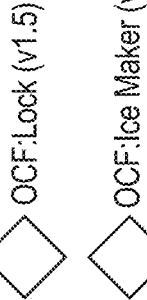
FIG. 24

SERVICE LAYER RESOURCE MANAGEMENT FOR GENERIC INTERWORKING AND EXTENSIBILITY

CROSS REFERENCE TO RELATED APPLICATIONS

This application is a continuation of U.S. patent application Ser. No. 17/568,162, filed on Jan. 4, 2022, which is a continuation of U.S. patent application Ser. No. 15/726,956, filed Oct. 6, 2017, which claims the benefit of U.S. provisional application No. 62/405,534, filed on Oct. 7, 2016, each of which are hereby incorporated herein by reference in its entirety.

BACKGROUND

Current service layer interworking architectures such as oneM2M provide various approaches to interwork nodes or devices from third party technologies. These include 1) standards mapping of third party technology resources (such as those for LWM2M objects) to service layer resources, 2) transparent interworking in which non-oneM2M data models are encapsulated within oneM2M resources, 3) retargeting interworking in which a mapped interface is exposed as a oneM2M resource and when that resource is accessed, the request is retargeted, and 4) full mapping of the semantics of non-oneM2M data model interworking. Each approach has its limitations. For the standards mapping approach, the third party technology resources are mapped to service layer resources during standardization. This mapping process is difficult to maintain and in the case of Lightweight Machine-to-Machine (LWM2M) Objects, it is incomplete, confusing, or altogether lacking. Both methods of transparent and retargeting interworking completely hide the data models of the interworked device, which limits the use of those resources to applications within the domain of interest. The full mapping of the semantics of non-oneM2M data model interworking provides one to one mapping of resources but does not scale well when there are a lot of different types of devices.

SUMMARY

In order for service layer interworking to work universally and efficiently, the data models of the interworked devices should be exposed to all applications and there should be a dynamic mechanism to add or update resource definitions and mappings of the data models of the interworked devices. These capabilities will enable service layer architectures to bring various vertical markets together into a single, horizontal platform. In addition, new resource types could be added to the service layer for extensibility. Disclosed herein are lightweight, dynamic mechanisms to support service layer interworking and resource extensibility.

For example, one mechanism disclosed herein comprises defining a new service layer (SL) resource definition registration procedure that allows for specifying custom attributes of service layer resources to represent third party technology resources. As part of the new functionality, additional procedures are introduced for managing the resource definitions.

A second mechanism disclosed herein comprises defining a new SL data model mapping registration procedure to map service layer resources to third party data models and to provide a new interworked retargeting indicator to the service layer. The same procedures used for managing resource definitions can also be used to manage data model mappings.

Further, a third mechanism disclosed herein comprises defining a SL generic interworking procedure to intelligently retarget requests toward interworked resources based on the retargeting indicator provided by the data model mapping.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 3A and FIG. 3B show an example oneM2M XML Schema Definition (XSD) document;

FIG. 16A and FIG. 16B show an example oneM2M resource definition document;

FIG. 17 shows an example oneM2M data model mapping document for an Interworking Proxy Entity (IPE);

FIG. 18 shows an example oneM2M data model mapping document for a service layer;

FIG. 24 illustrates an example user interface;

DETAILED DESCRIPTION

Terms and Definitions

Figure 1:
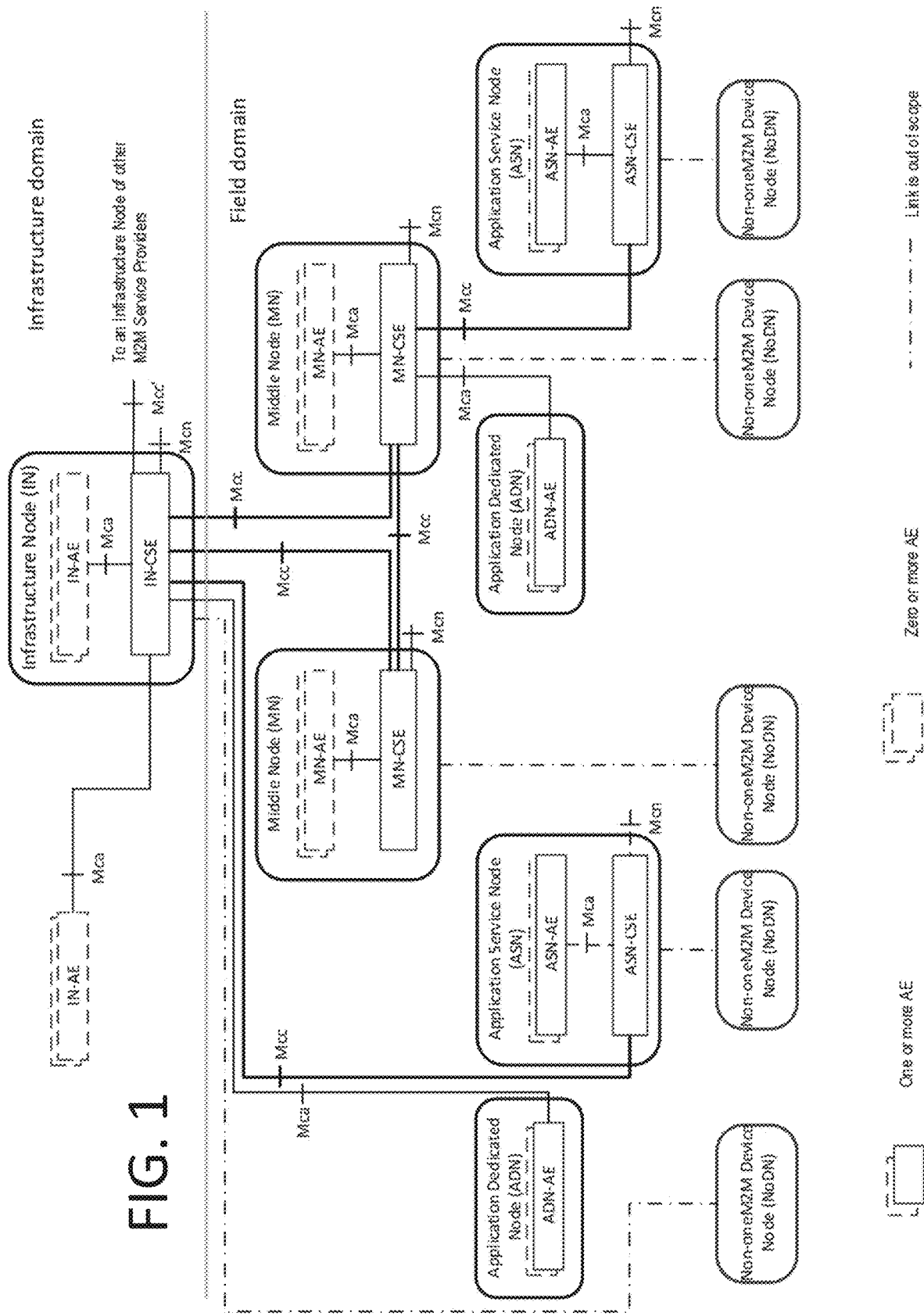
FIG. 1 illustrates an example oneM2M service layer architecture.

This section is not intended to be used to limit the scope of the claimed subject matter, nor is it intended to be used to limit the scope of any of the terms discussed below to the definitions provided.

Interworking refers to the workings of an external technology within the domain of a second technology. For example, LWM2M may be interworked into oneM2M. Typically, interworking entails some form of protocol translation and data model mapping between the two technologies.

LWM2M is considered a third party technology that is interworked with the SL architecture. It is a lightweight client-server protocol defined for use in device management and service enablement of devices, which are typically constrained in nature with limited processing (CPU, MCU) and storage (RAM, ROM) capabilities.

The name of a SL resource may be represented with the name resourceName. This convention is the same as that of the convention used in oneM2M.

Resource activation is a SL process in which a resource definition is made available to be used by a service layer. The process may include authenticating the requestor, extracting information from a resource definition document to create a schema document for the resource/resource type, updating supported resource type attributes for discovery purposes, etc.

Resource deactivation is a SL process to remove a schema document from a SL repository so future resources based on the removed schema cannot be created. This process is only performed if a resource type is no longer in use and is being retired.

A resource definition is a document that describes in detail a service layer resource type. The document includes information such as the resource type, the name of the specialized resource type if one exists (e.g., in oneM2M, battery is a specialization of the mgmtObj resource type), version number, where in the resource tree instances of the resource can be created, the attributes of the resource instance, activation procedures, etc.

A resource instance is an entry in a service layer resource tree that corresponds to a resource type. Attributes of the instance will contain data pertinent to the purpose it was created for.

A resource type denotes a purpose for the resource, such as for an application, a container, or a subscription resource.

Retargeting is the process in which a request to a SL resource or attribute at one SL entity A (e.g., a server) is redirected to another entity B (e.g., a device) where the requested information resides. The SL at entity A in this case acts as a transport mechanism between the requestor and another entity B (e.g., the device).

A resource schema is a template for specifying the contents of a resource type. An XML Schema Definition (XSD) is an example of a resource schema document in Extensible Markup Language (XML) format.

An XSD describes the structure of an XML document by showing the elements and attributes that can appear in the document, the number and order of the child elements, the associated data types, and possibly default or fixed values for the elements/attributes. In oneM2M, each resource type has a corresponding XSD that shows how the resource should be constructed and what information is contained in the resource.

M2M/IoT Service Layer

An M2M/IoT Service Layer (SL) is a technology specifically targeted towards providing value-added services for M2M/IoT devices and applications. A global standard body such as oneM2M is developing M2M/IoT SLs to address the challenges associated with the integration of M2M/IoT devices and applications into deployments with the Internet/Web, cellular, enterprise, and home networks, as demonstrated in TS-0001 oneM2M Functional Architecture, V-2.10.0. An example of oneM2M SL architecture is shown in FIG. 1, which depicts various reference points associated with a Common Services Entity (CSE). The Mca interface provides service layer access to Application Entities (AEs), while the Mcc and Mcc' reference points allows for CSE to CSE communications. Finally, the Mcn interface provides access to the underlying network technology.

The oneM2M architecture also provides the capability to interwork with non oneM2M technologies, as shown in FIG. 1. These interworked devices are also referred to as Non-oneM2M Device Nodes (NoDN) and their inclusion in the architecture is one key reason oneM2M can truly claim it is a horizontal platform that can interoperate with all vertical markets.

An M2M/IoT SL can provide applications and devices access to a collection of M2M/IoT oriented capabilities. A few examples of these capabilities include security, charging, data management, device management, discovery, provisioning, and connectivity management. These capabilities are made available to applications via Application Programming Interfaces (APIs) which make use of message formats, resource structures and resource representations supported by the M2M/IoT SL.

Service Layer Resource Management

Figure 2:
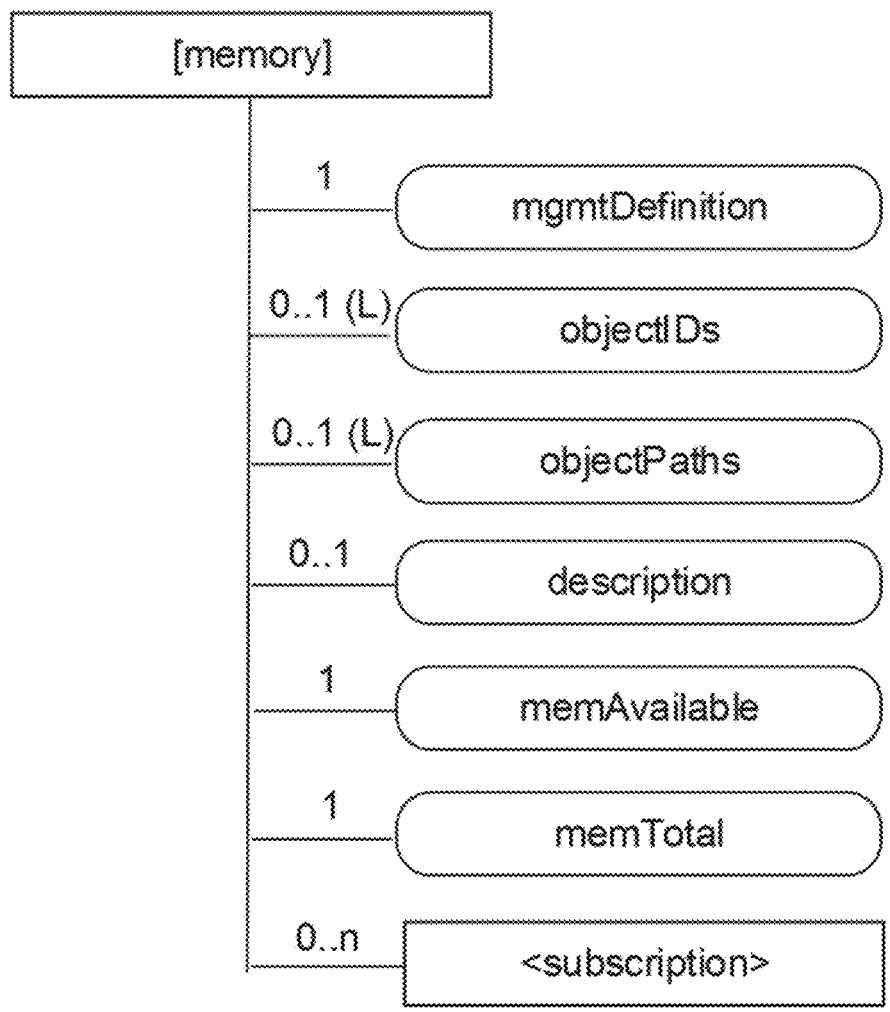
FIG. 2 shows an example oneM2M resource.

In resource oriented service layer architectures, resource management provides the means for applications and devices to communicate with each other. In oneM2M, a resource has attributes and child resources to provide data exchanges between entities. For example, FIG. 2 shows an example oneM2M resource in which the oval shapes represent attributes and the rectangular shapes (e.g., <subscription>) represent a child resource. The attributes specify the data model of the corresponding resource (e.g., memAvailable and memTotal) and may also include meta-data that offers additional information, such as mgmtDefinition and description attributes of the resource. Resources may have defined attributes and child resources that are specified by the standard. As such, the standard has defined what resources and attributes are, the data types supported, where in the resource tree a particular resource belongs, the multiplicity of certain resources or attributes, the schema document that describes the resource type, XSD validation performed during the creation of a resource, etc. Collectively, the semantics of the resource and the procedures used to manage access to the resource is referred to as resource management.

Contrary to the majority of oneM2M resources with defined attributes, two oneM2M resource types exist in which the resource attributes can be customized: <mgmtObj> and <flexContainer> resources. <mgmtObj> and <flexContainer> resources allow for defining specializations of the corresponding generic resources. In other words, these resources allow for defining custom attributes of either the <mgmtObj> or <flexContainer> resource for specialized functionality not found in other oneM2M resources. <mgmtObj> resources may require standardized mappings to the underlying technologies as discussed in TS-0004 Service Layer Core Protocol, V-2.5.0, and TS-0006 Management Enablement (BBF), V-1.1.4. <flexContainer> resources contain a containerDefinition attribute in which a link or Uniform Resource Indicator (URI) to the schema of the resource is provided to the service layer. However, no procedure is currently defined to describe what the service layer does with the attribute.

Associated with each resource definition is an XML Schema Definition (XSD) document that describes the attributes and child resource(s) the parent resource may have. In addition, the XSD document specifies the order the attributes and child resources must appear in, the multiplicity of each as well as the associated data type. These "rules" from the XSD are validated upon resource creation. An example of a oneM2M XSD document for the [memory] specialized <mgmtObj> resource is shown in FIG. 3. The XSD document shows that the [memory] resource has two resource specific attributes: "memAvailable" and "memTotal," as well as an indication of whether the resource can be announced. In addition, the order of all attributes and for each one its multiplicity, whether it is mandatory or optional, and the associated data type are all provided by the XSD document. As a result, the XSD document defines information the SL needs for managing the resource and exposing it to applications interested in accessing the resource.

Service Layer Interworking

Figure 4:
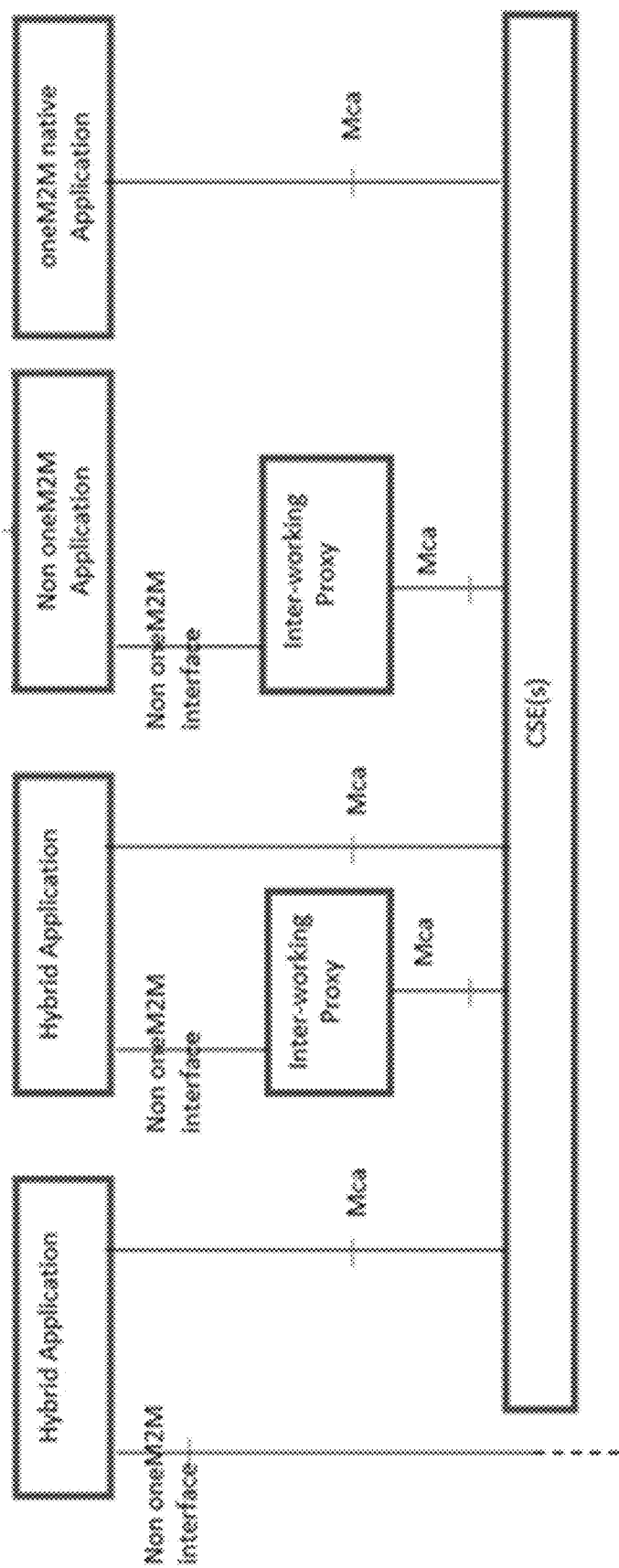
FIG. 4 shows an example oneM2M interworking architecture.

SL interworking is a key component that enables the SL architecture to be a horizontal platform for all vertical markets. Exemplary interworking configurations within oneM2M are shown in FIG. 4. When non-oneM2M entities are interworked, an Interworking Proxy Entity (IPE) is required for translation between non-oneM2M and oneM2M protocols. A component of the translation involves the mapping of oneM2M resources to non-oneM2M data models and vice versa. The IPE is typically realized as a oneM2M AE that interfaces to a CSE using the Mca interface. In addition to the Mca interface, the IPE has a non-oneM2M interface that communicates to the interworked entity through its native protocol.

Three forms of oneM2M interworking are specified by TS-0001. These include interworking with full mapping of the semantic of the non-oneM2M data model to Mca, interworking using containers for transparent transport of encoded non-oneM2M data and commands via Mca, and interworking using a retargeting mechanism via AE or CSE resources.

Full mapping of the semantic of non-oneM2M data model interworking involves an IPE or AE to map one-to-one the resources of an interworked device into appropriate oneM2M resources and attributes. For example, for a device with temperature, humidity, and light sensors, an IPE or AE will create three oneM2M resources to each represent the individual sensor. This is considered a full mapping. As a result, a manual process is undertaken during the design of the IPE/AE to support devices for interworking. This process is required for each new device that is interworked to the service layer.

Transparent interworking involves encapsulating non-oneM2M data models within oneM2M container resources and requiring AEs to encode and decode the data. This tunneling of information within oneM2M resources is inefficient and pushes the complexity to the AEs. As a result, only AEs with the required knowledge of the underlying data model and protocol may use the data encapsulated in the container resources.

Retargeting interworking, on the other hand, completely bypasses the majority of functionalities the service layer offers. In this form of interworking, an AE or CSE provides a mapped interface of oneM2M resources and when a resource is accessed, the operation will be retargeted to the IPE. In this case, no insight into the contents of the data model is provided.

In addition to the three forms of interworking discussed above, a fourth form of interworking is described in the device management sections of the oneM2M specifications TS-0001, TS-0004 and TS-0006. For device management, <mgmtObj> resources are standardized oneM2M resources that represent data models of the underlying device management (DM) technology, and AEs access these <mgmtObj> resources to manage the devices.

OMA LWM2M

Figure 5:
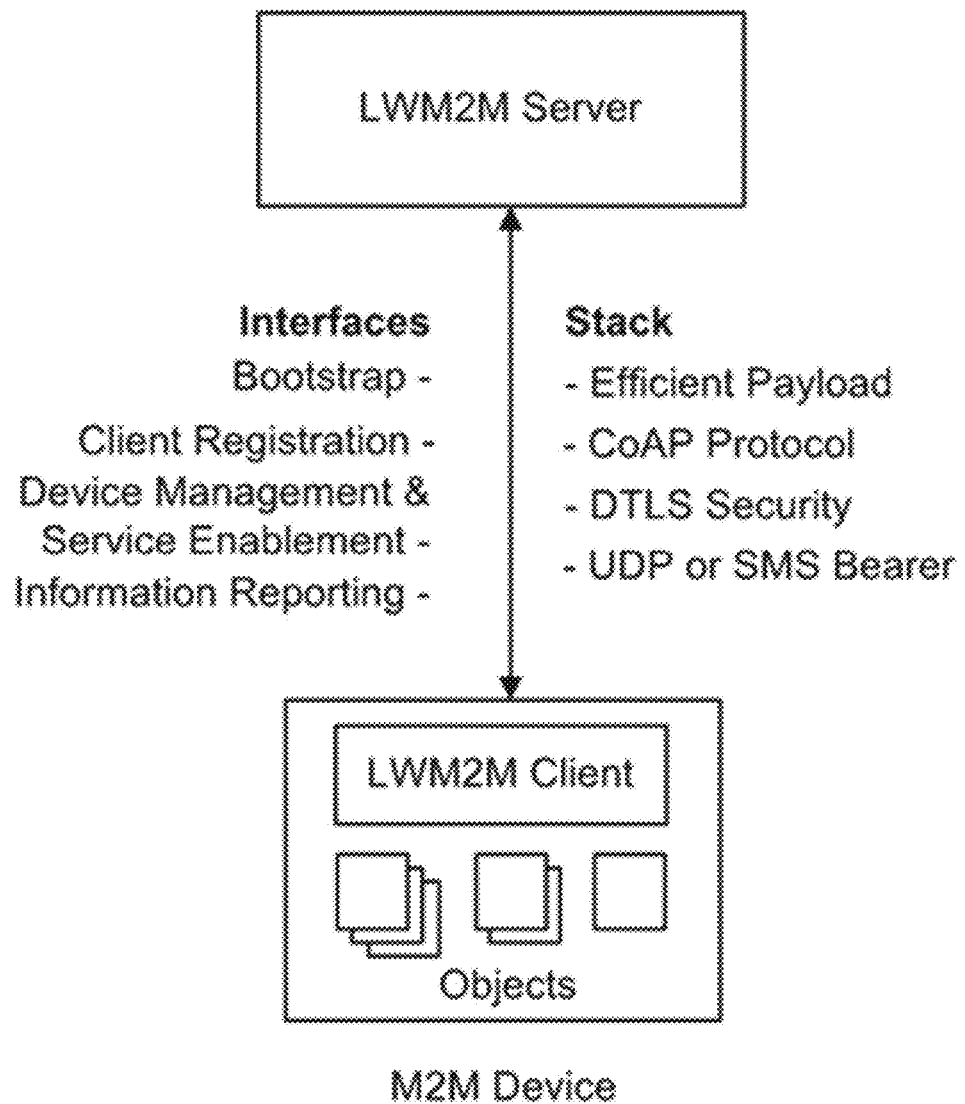
FIG. 5 shows an example Lightweight M2M (LWM2M) architecture.

The Lightweight M2M (LWM2M) protocol is based on a client-server architecture that features a simple and flat resource structure that is more applicable to constrained devices. Additional information on the LWM2M protocol may be found in Open Mobile Alliance (OMA) Lightweight Machine to Machine Technical Specification, Version 1.0. The resource tree is defined as LWM2M Objects with underlying resources organized in a flat structure with few levels of hierarchies. The definitions of Objects and resources in LWM2M are mapped respectively to that of resources and attributes in oneM2M architecture. An exemplary LWM2M architecture is shown in FIG. 5.

In addition to supporting device management, the LWM2M Protocol also supports service enablement provided by the constrained devices. Since constrained devices mostly provide data measurements for particular applications, information reporting is the main service enablement specified in the protocol. As such, the design of the Objects focuses on providing resources that will support device management and information reporting.

Example Deployment Scenario Using Existing Service Layer Standards

Figure 6:
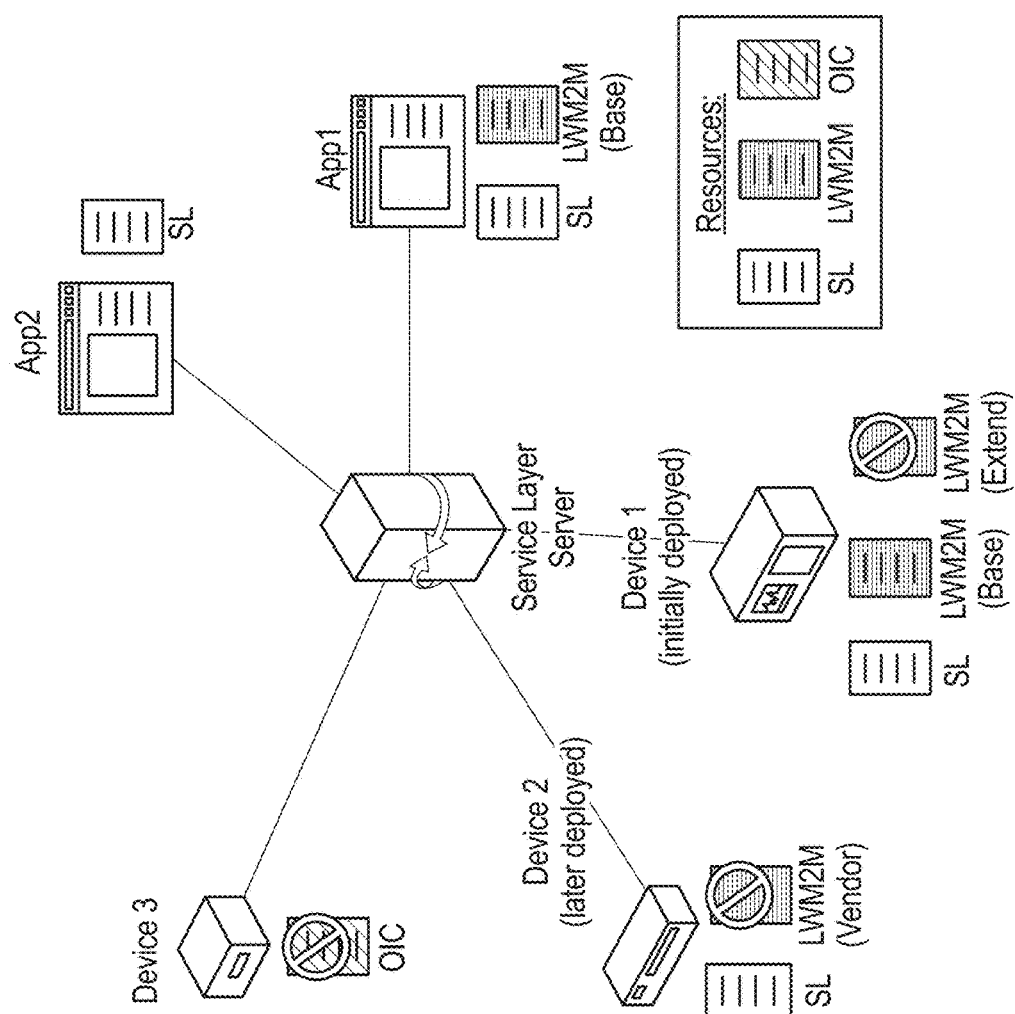
FIG. 6 illustrates an example use case involving generic interworking as defined by service layer standards such as oneM2M.

FIG. 6 shows an example service layer deployment scenario in which a service layer (e.g., oneM2M server) supports LWM2M interworking. At the time of deployment, the service layer supports the LWM2M Objects specified in TS-0001, the TS-0005 Management Enablement (OMA), V-1.4.1, and OMA LWM2M Technical Specification. As shown in FIG. 6, Customer1 initially deploys Device1 which supports the LWM2M Objects defined in the OMA LWM2M Technical Specification, and App1 is used to manage Device1. After some time, Device1 is updated with some extended LWM2M Objects such as LockWipe and Connectivity Management objects that were not defined in TS-0001 or TS-0005. Since the new LWM2M Objects were not originally specified in TS-0001 and TS-0005, they are not supported by the service layer. Furthermore, Customer1 deploys Device2 that contains some vendor specific LWM2M Objects that are not defined in either TS-0005 or the OMA LWM2M Technical Specification. Once again, the service layer is not able to support these new Objects.

In another instance, Customer2 wants to consolidate its operations since it is managing devices from two different technologies, for example, oneM2M and the Open Internet Consortium (OIC). Customer2 already uses App2 to manage its service layer devices and would like to migrate its OIC devices into the service layer. This way, Customer2 will be able to only use App2 to manage all of its devices. Similar to the LWM2M scenario described above, Customer2 is not able to manage Device3 using the service layer as this OIC device is not supported.

Figure 7:
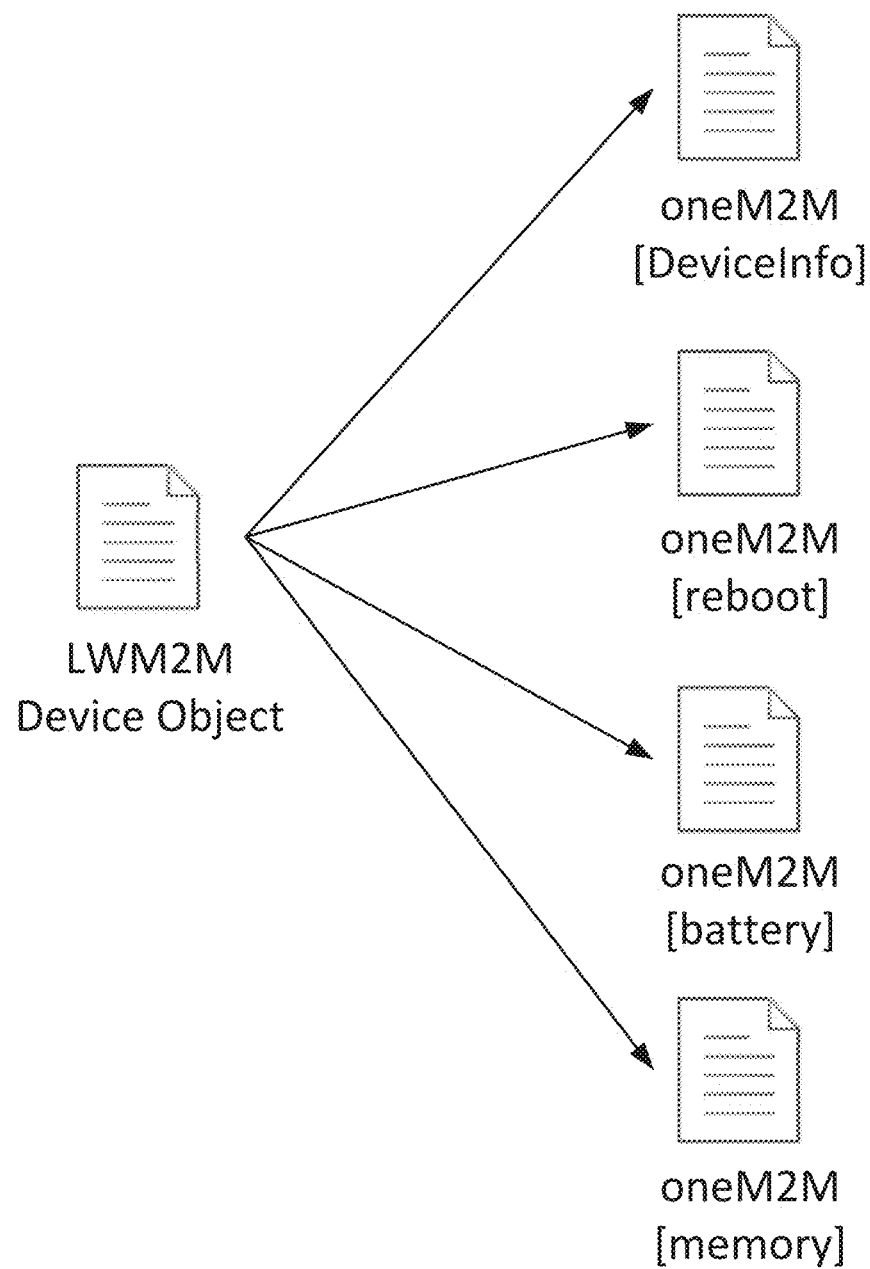
FIG. 7 shows a LWM2M Device Object mapped to four oneM2M mgmtObj resources.

The scenario described above illustrates a gap in the way that generic interworking is defined by service layer standards such as oneM2M. Currently, oneM2M defines resource mappings for data models of interworked technologies such as, for example, LWM2M (as described in TS-0014 TWM2M Interworking, V-0.13.0), AllJoyn (as described in TS-0021 oneM2M and AllJoyn Interworking, V-0.3.0), and OIC (as described in TS-0024 OIC Interworking, V-0.4.0) in an abstract way. These mappings are incomplete, confusing, or altogether lacking. For example, in the case of LWM2M, there is no one-to-one mapping between the data models. Additionally, the LWM2M Firmware Update Object does not have all its resources mapped to oneM2M [firmware] attributes. As shown in FIG. 7, the LWM2M Device Object is mapped to four different oneM2M <mgmtObj>s. Finally, the LWM2M Connectivity Monitoring and Connectivity Status Objects are not even mapped to oneM2M resources.

Two other oneM2M interworking approaches completely hide the data models of the interworked devices from the service layer. In these cases, the interworked resources are encapsulated in "Content Sharing Resources" which could be represented as CSE, AE or container resources. In transparent interworking, the non-oneM2M data model is encapsulated within a container resource, which requires applications to encode and decode the data. Due to the encoding and decoding requirements, oneM2M applications need to understand oneM2M protocols as well as the protocol of the interworked technology. Similarly, retargeting interworking completely bypasses the majority of functionalities the service layer offers. In this form of interworking, a CSE or an AE resource is typically created to represent the interworked entity and requests to the resource are retargeted to the IPE. By hiding the interworked data model from the service layer, these two approaches limit the interworking to applications within the domain of interest.

In the full mapping of the semantic of non-oneM2M data model interworking, one to one mapping of the interworked data model to oneM2M resources is provided. However, the process in which this full mapping is done is manual in nature and performed during the design of the IPE/AE. This method does not scale well when there are a lot of different types of devices. Each device requires its own mappings and updates to the IPE/AE design.

Finally, the example shown in FIG. 6 highlights the lack of support for an important feature of a horizontal service layer platform such as oneM2M—the ability to efficiently and dynamically support vendor specific data models. The oneM2M standard already provides resources that could be customized, e.g. <mgmtObj> and <flexContainer> resources, to support interworking. However, oneM2M currently lacks a procedure to take advantage of the ability to customize resource attributes dynamically. These vendor specific resources are critical for vendors from the same vertical markets to differentiate their product offerings and show the value-add of their platform. When expanded to include vendors from different vertical markets, the benefits of such a dynamic interworking mechanism are magnified.

Generic Interworking within Service Layer Architectures

In order for service layer interworking to work universally and efficiently, the data models of the interworked devices should be exposed to all applications and there should be a dynamic mechanism to add or update resource definitions and mappings of the data models of the interworked devices. These capabilities will enable service layer architectures to bring various vertical markets together into a single, horizontal platform. In addition, new resource types could be added to the service layer for extensibility. Disclosed herein are lightweight, dynamic mechanisms to support service layer interworking and resource extensibility.

Figure 8:
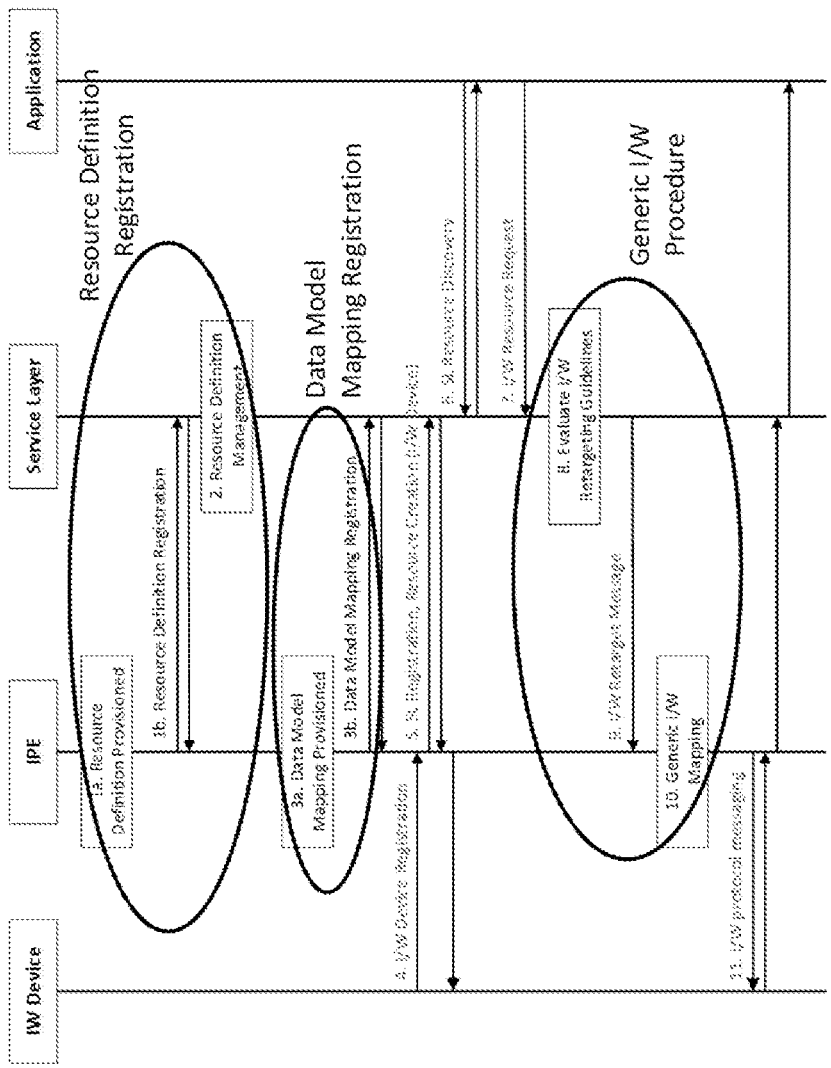
FIG. 8 illustrates an example end to end procedure for service layer generic interworking.

For example, FIG. 8 shows a high level overview of an exemplary end to end procedure of enabling generic interworking within service layer architectures. FIG. 8 is one realization of the interworking architecture shown in FIG. 4. As discussed herein, one-to-one mappings of third party data models may be provided to service layer resources as part of the interworking. Further, the service layer may be configured to support new resource types or combinations of existing resource types. The new resource types, however, are limited to operations supported by the service layer. If new functionalities or services are required for the new resource types, alternative means of enabling those functionalities or services must be enabled to support the new resource types.

In accordance with one aspect disclosed herein, a resource definition document describes a resource type similar to how a resource type is defined in a standard specification. For example, a oneM2M <AE> is described in TS-0001 in which the AE's attributes and child resources are listed, what common attributes it has, where in the resource tree it exists, the multiplicity of its attributes and child resources with the corresponding data types, etc. In addition, protocol bindings are provided in TS-0004 in which the following may be specified: data types and XSD or schema files, short names used, optionality of primitive attributes, procedures for access to the resource, etc. All of this information is contained in the resource definition document, which also includes additional instructions for how the service layer should activate the resource definition to enable it for use.

In accordance with another aspect disclosed herein, a data model mapping document may be used to provide one-to-one mapping of third party resources to service layer resource attributes. As a result, it resembles portions of a schema file that describe the resource specific attributes. This document provides mappings of service layer resource attributes to third party resources such as those provided in TS-0005 for LWM2M. This information is used during protocol translation. In addition, the data model mapping document includes a retargeting indicator for each resource attribute to direct the service layer on when to retarget retrieve requests to minimize messaging traffic.

As shown in the example of FIG. 8, an IPE is first provisioned with a new resource definition for an interworked device. This resource definition is then registered to a service layer, which adds the management of the new resource to the service layer's operation. Next, a data model mapping is provisioned to the IPE in which the data model of the interworked device is mapped to SL resource attributes. This data model mapping is also registered to the service layer to provide retargeting indicators for optimizing messaging to interworked resources. The interworked device is then registered or provisioned to the IPE, which in turn registers the device to the service layer. For example, a LWM2M device registers to a LWM2M server, which is part of the IPE, and the IPE will then registers the device to the service layer.

As an initial step, although not shown in FIG. 8, the IPE and service layer are provisioned to communicate with each other securely, for example, by including SL registration and access control provisioning. FIG. 8 shows an IPE registering both the resource definition and data model mapping documents to the service layer. Similarly, a managing SL application or server administrator could also register these documents to the service layer instead of the IPE. The terms IPE, managing SL application, and service layer administrator may be used interchangeably.

Once all of the registration procedures are completed (e.g., after steps 1 to 5 are completed), an application can use the service layer's resource discovery procedure to find the new interworked device resource. The application then makes a request targeting the interworked resource, and the service layer evaluates the criteria of the interworked retargeting indicator to make a determination on whether to initiate a generic interworking procedure. If initiated, the service layer retargets the application's request to the IPE, which performs the generic interworking mapping from the SL protocol to the native interworked device's protocol. Note that some SL requests may not be retargeted to the IPE if the requested data is static in nature. However, at least one retargeted request is required to retrieve the static data. The response returned from the interworked device is relayed from the IPE, to the service layer, and finally to the application. The service layer may cache the response dependent on the retargeting indicator.

SL Resource Definition Document Registration Procedure

In accordance with the first aspect disclosed herein, prior to enabling interworking at the service layer, a resource definition is defined to provide a one-to-one mapping from interworked device resources to SL resources and attributes. The resource definition essentially reflects the same work performed during standardization in which a resource type is defined, the name given to a specialized resource type if one exists, the attributes and child resources for the resource type, a schema document to describe the resource for use in validation the creation of the resource, and other information and procedures to manage the resource. The information required for a resource definition is captured in a document that is then provisioned to an IPE, a managing application, or a server administrator for registration into the service layer using the ideas in this paper.

The one-to-one mapping consists of two steps: identifying the native data model required to access and/or manage the device and mapping the device's native data model to service layer resources and attributes. The result of the mapping will generate both a SL resource definition document and a data model mapping document. The resource definition document is provided to the SL for defining new resources or resource types, that is, defining new custom resources or custom resource types, while the data model mapping document is provided to the SL for interworking. Within the SL, the data model mapping document provides retargeting indicators to tell when a service layer should retarget requests for a resource. The IPE uses the data model mapping document for both protocol translation and retargeting. Protocol translation may involve creating a new message that the interworked device understands. Retargeting may involve the IPE communicating with the interworked device to get a response to return to the service layer.

Once the resource definitions and data model mappings are completed, the documents are provisioned to the IPE to initiate the corresponding registrations to the service layer. The IPE will first register the resource definition to the service layer. This registration is different than current SL registration as it is registering a new resource definition rather than requesting the SL to create a new instance of a SL resource. As a result, the target URI of the registration request is to a virtual resource, which signifies to the SL that a resource definition is being registered.

The purpose of targeting a virtual resource instead of a normal SL resource is to inform the service layer that the registration operation is outside the normal mode of operation and no resource instance is being created in the resource tree. However, a new service layer resource can also be created in the resource tree to host all the resource definitions the service layer supports. In this case, the target URI of the registration request will target the new SL resource. For example, a new "resourceDefinitions" resource could be created in the SL resource tree to store all the resource definitions. The target URI could be in the form of, for example, "/resourceDefinitions" or "/<SL name>/resourceDefinitions". In this case, the resource definition must contain two extra attributes that a resource definition using the virtual resource approach will not have: activate and deactivate. These attributes will be utilized to enable the use of the resource definition as described below.

The service layer can manage the resource definition registration in several ways. The service layer may save the resource definition in an internal repository where it may be used for validating future requests targeting the resource. This could be realized as saving a file in some location within the service layer server. Alternatively, the service layer may create a resource in the resource tree to expose the resource definition to registrants of the service layer through normal resource discovery. This is how current service layer resources are processed. In addition, the two alternatives could be combined together to provide for more transparent, flexible and functional operations.

Figure 9:
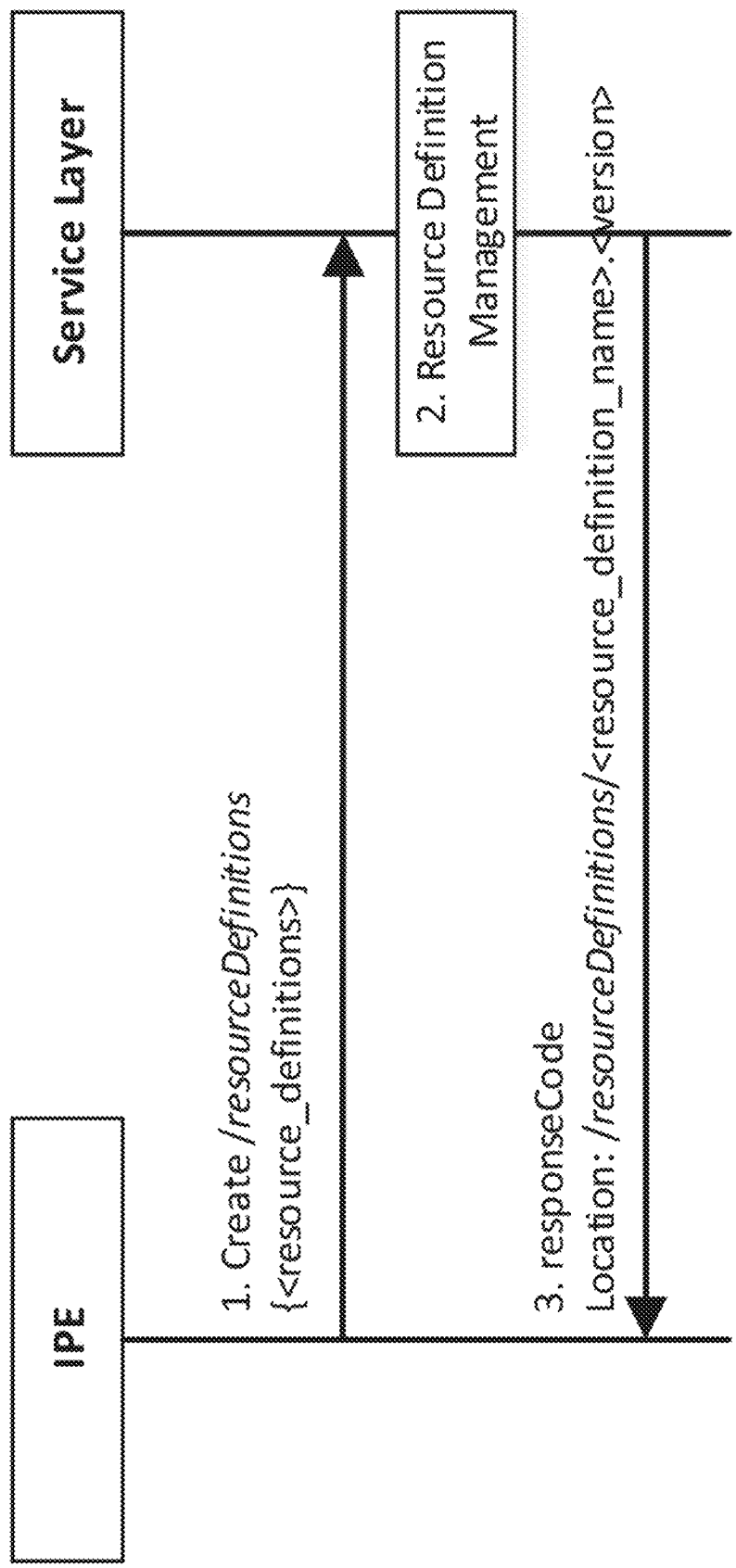
FIG. 9 shows an example service layer resource definition document registration procedure.

FIG. 9 shows an exemplary resource definition registration procedure that the IPE makes to the service layer, as discussed below.

In step 1, after the IPE is provisioned with the resource definition document of the interworked device, it registers the document to the service layer. In the registration request, the IPE targets a virtual resource to indicate the registration is one for a resource definition. An example URI for the virtual resource could be in the form of: /<SL name>/resourceDefinitions. Included in the request is the resource definition document for the interworked device. This document will include information the service layer needs to manage the resource and expose it for resource discovery. Table 1 shows the different components that make up the resource definition document. The information provided will enable the service layer to extract a oneM2M XSD document from the resource definition document for use after activation. Alternatively, a URI can be provided in the registration request in which the service layer can retrieve the resource definition document from.

As an alternative to explicitly registering resource definitions to a service layer, the resource definition registration could be triggered implicitly through the creation of a resource which has an attribute that provides a URI to a schema document. In this case, the service layer will process the request to both register the schema document and also activate the definition in step 2. This alternative is limited to existing service layer resources that contain an attribute for specifying the location of a schema file, and cannot be used to create new resource types in the service layer.

In step 2, the service layer evaluates the resource definition provided by the IPE to verify that it contains all of the required components specified in Table 1 and all of the required information within each component. Note that the information requirements are implementation specific. This is especially important for the contents of the activation criteria provided. In the case that a URI was provided in step 1, the service layer first downloads the document before evaluating the resource definitions. After determining the resource definition is valid and acceptable, the service layer adds the document to its resource definition repository for use in activating the resource definition.

When this procedure is triggered by the creation of a service layer resource that contains a URI to a schema document, the service layer performs additional processing to activate the retrieved schema document. The additional processing is implementation dependent and may include the following: validating that the schema document is well formed, saving the schema document to the service layer's local repository, making the schema document available for resource discovery, etc.

In step 3, the service layer sends an appropriate response to the IPE. If the create was successful, the service layer may provide a URI for use in retrieving the resource definition. The URI may consist of the virtual URI prefix from step 1, the resource name or other identifier provisioned by the service layer for the resource definitions, and the version of the resource definition. If the procedure was triggered by the creation of a resource that contains a URI to a schema document, the service layer returns a normal create response along with a URI to access the schema document.

TABLE 1

Components of a Resource Definition Document

| Component Type | Fields |
| --- | --- |
| Information about the resource definition | This section specifies the resource type, the name of the specialized resource type if one exists (e.g. in oneM2M, battery is a specialization of the mgmtObj resource type), version number, short name abbreviation, resource label string, where in the resource tree the resource exists, etc. |
| Inherited resource attributes | Specifies whether the resource will contain universal and/or common attributes |
| Resource specific attributes | List of resource specific attributes, their data types, mandatory/optional indicators, etc. |
| Child resources | List of child resources that exist for the current resource, including multiplicity |
| Activation criteria | Criteria to activate the resource definition, such as integrate into SL, authorization check, create and save schema document to repository, etc. |

The procedure specified in FIG. 9 shows an IPE making the resource definition registration request. Alternatively, this request may be made by a managing service layer application. This managing application may be used for managing the operations of the service layer and may have special access privileges for altering the server's operation. The application may be controlled by the service provider or the service layer owner. A third alternative is for a service layer administrator to perform the resource definition registration. This functionality may be built into the service layer operation and could be realized through a web interface, a command line interface, or through some other mechanism.

Note that the procedure specified in FIG. 9 could be used to define new resource types that did not exist at the time of service layer deployment. For example, a service layer is deployed based on release 1 of resource definitions. After deployment, new resource types are created in release 2. Using the procedures outlined in this section, the service layer could be updated to support the new resource types. Furthermore, the procedure also allows for supporting various versions of the same resource type. This enables the service layer to operate with both legacy and new devices using different versions of the same resource.

SL Resource Definition Management Procedures

Once a resource definition has been registered, the service layer provides the ability for the definition to be managed through procedures for discovery, retrieval, update, removal, activation, and deactivation. Note that the management of the resource definition determines how the procedures to access the definitions are performed. If the service layer exposes the resource definition as a resource in the resource tree, then normal SL requests (discover, retrieve, update, and delete) will be used to access the resource definitions. However, if the service layer saves the resource definitions to a file and stores them in an internal repository, then the following procedures are defined to access the resource definitions.

The management of the resource definitions involves two sets of repositories: one for the resource definition documents and another one for the schema documents. The resource definition document is used by the service layer to generate the corresponding schema documents during the activation procedure described below. As a result, the documents are stored in separate repositories. The resource definition repository may be made only accessible to IPEs, managing applications, or service layer administrators that are granted access through a stringent authorization process. This repository may be used to indicate the resource definitions of all resources the service layer supports and is not accessed during normal service layer operations. The schema document repository may be restricted to only the service layer itself and its administrators as it is used during normal operation such as validating create requests of resources. This restriction may be put in place to prevent external entities such as IPEs to possibly interfere with the operation of the service layer. As a result, IPEs and managing applications may only have read access to the schema repository.

These management procedures allow for authorized entities such as a server administrator to interact with the service layer to not only create new resource types but also to define new resource types based on existing resource types. Administrators can discover and retrieve existing resource types using this interface to create new resource types based on the retrieved resource type. Service layers can also use this interface to exchange resource definition documents with other service layers to update their operations. In addition, new versions of the same resource type can be created should changes to the resource type be made through standardization. Finally, vendors who are authorized can define their own specific resource and use the interface to register their resources for differentiating their product offerings.

Resource Definition Discovery

Figure 10:
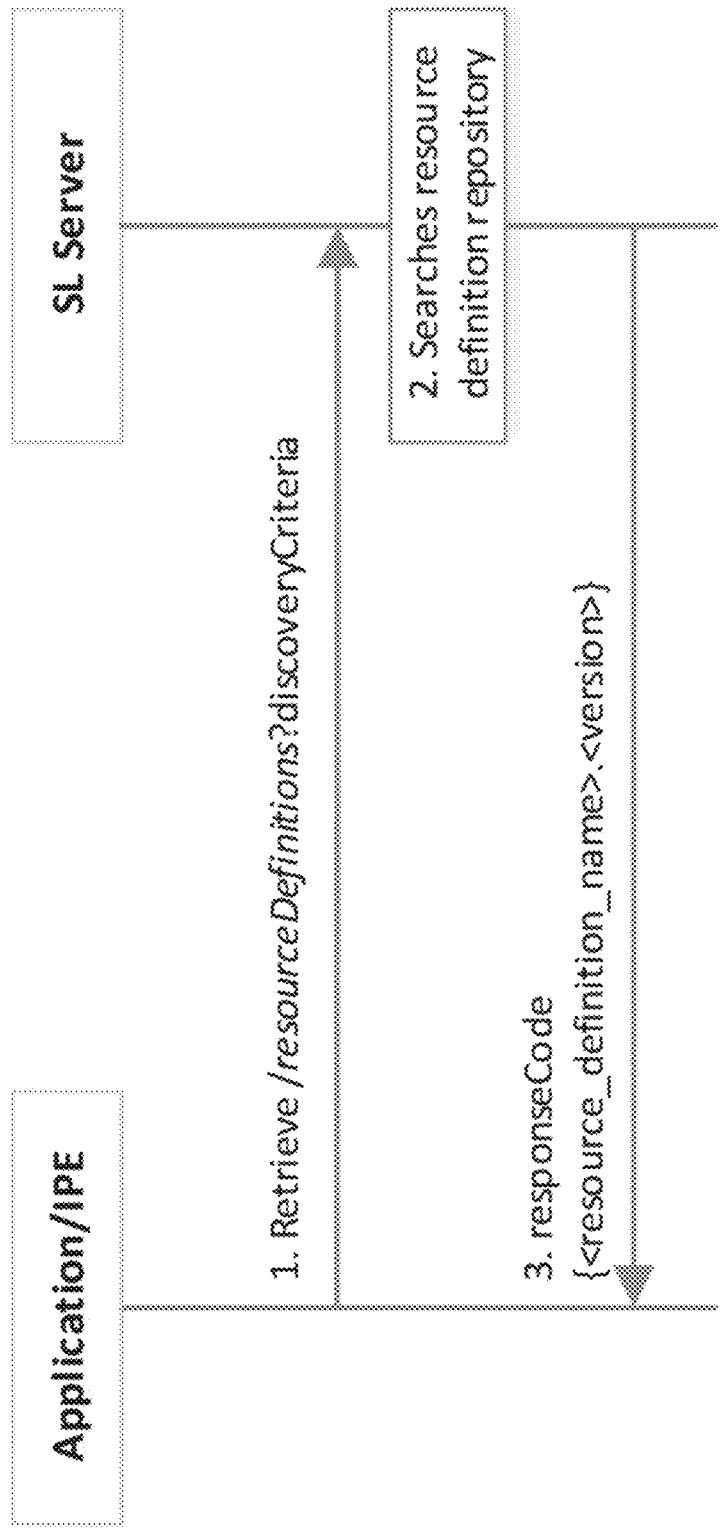
FIG. 10 shows an example simplified service layer resource definition discovery procedure.

Similar to existing SL resource discovery, resource definition discovery is performed to find what resource definitions are supported by the service layer. The same target URI used for the resource definition registration may be used for resource definition discovery. A simplified version of the service layer resource discovery procedure may be used to discover these resource definitions. The differences between existing SL discovery and this simplified discovery are that the target URI is a virtual resource and the filter criteria is replaced by a discovery criteria. Since this discovery request is focused on the resource definitions, there is no need for using the more complex filter criteria. Attributes such as created before, modified since, size above, limit, semantics-Filter, etc. may not apply to the resource definition discovery request. FIG. 10 shows an exemplary simplified discovery procedure, as discussed below.

In step 1, an application or IPE performs a Retrieve operation targeting a SL resource such as the URI used when registering the resource definition. The request can include discovery criteria to narrow the search for specific resource definitions. The discovery criteria may be composed of a list of key-value pairs. Some examples of the criteria are shown in Table 2.

In step 2, the service layer receives the request, identifies the discovery criteria, and searches its internal repository to locate the desired resource definitions. If more than one resource definition is found, the service layer may compile a list of resource definition names.

In step 3, the service layer returns the list of resource definition names and associated versions that match the discovery criteria with the appropriate response code. Note that the resource definition names may include a version number as well as multiple versions of the same resource definitions. Optionally, the list returned could include the URIs of the resource definition documents and/or the schema documents by which an IPE can retrieve the contents of the definition or schema documents.

TABLE 2

Examples of Resource Definition Discovery Criteria

| Discovery Criteria | Description |
|---|---|
| Resource type definition name | The name of the registered resource definition which may include the corresponding version |
| Resource type | The type of the resource in the service layer |
| Definition version | The resource definition version |
| Resource tree location | Resource tree URIs where the resources can be created |
| Definition activated | The state (activated/deactivated) of the resource definition |
| Contains attribute | An attribute name that is supported by the resource |
| Contains child resource | A child resource that is supported by the resource |
| Executable attribute | Any resource that contains an attribute that is executable |

Resource Definition Retrieval

Once the name or URI of a resource definition is discovered, an application or IPE can retrieve the contents of the desired definition. The request is similar to that of a SL retrieve request of a resource, the differences being in the URI of the request, which is the concatenation of the virtual URI with the resource definition name, and the fact the service layer fetches the resource definition from its internal repository. The response to the retrieval request will include the resource definition and an indicator of whether the definition has been activated or not. If the resource definition registration was automatically triggered due to the creation of a resource that provides a URI to a schema document, the URI to access the schema document is provided in the response to the create request or via the resource definition discovery procedure described above.

Resource Definition Update

When resource definitions are managed by an internal repository, there is limited provision for updating the definition since it is carried in a file. If the update involves changing values of what already exists in the resource definition document, then partial updates are allowed. The update request provides the value(s) that needs to be changed. However, if the update involves adding or deleting contents to the file, then the application or IPE will need to update the entire definition file using the Create request specified by FIG. 9. This results in a simplification of the management of definition files by not requiring the service layer to parse the file, locate where to update the file, and add the new contents to the file.

Resource Definition Removal

A resource definition can be removed prior to being activated or after it has been de-activated. This procedure is similar to a SL delete of a resource except the deletion is of a resource definition file rather than a resource instance in the resource tree. Note that if a resource definition is activated, it cannot be removed from the repository. This prevents the deletion of a resource definition while a resource based on the definition is still in use. If a resource definition is activated but there are no resources in use, then it is up to the service layer whether to allow the resource definition file to be deleted.

Resource Definition Activation

Once a resource definition has been registered, the resource definition should be activated for use by the service layer. The process of activation could be used to trigger various checks and procedures before the resource definition can be used by the service layer. Examples of what can be triggered include: 1) an authorization check by the service provider or owner of the service layer to ensure the requestor can activate the resource definition, 2) the extraction of a schema document like the one described in FIG. 3 from the resource definition document, 3) a validation that the extracted schema document is well formed, 4) and saving the schema document to the service layer schema repository and integration into service layer operations including updates to resource discovery mechanisms. There are other potential uses for this activation process, and the aforementioned uses could be combined together as part of the activation process. Once the activation is completed, the service layer can use the extracted schema document to create resources in its own resource tree.

Figure 11:
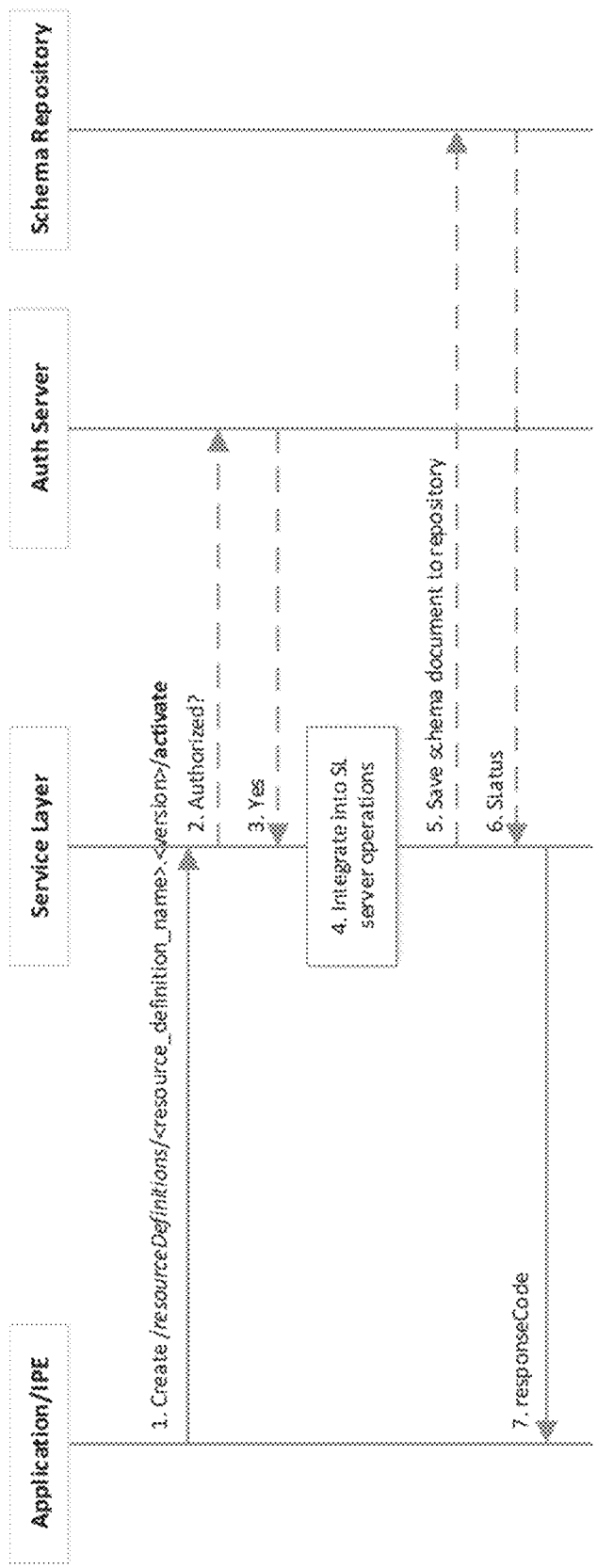
FIG. 11 shows an example service layer resource definition activation procedure.

The process of activation is important as it changes the behavior of the service layer, for example, by validating create requests of the new resource types or modification of existing resource types and changes to the schema and database repositories (for creating the resource instance). In addition, the authorization checks may be more involved than a standard access control check as the activation may cause unwanted behaviors in the service layer if not performed correctly. FIG. 11 shows some possible actions resulting from the activation process, as discussed below.

In step 1, an application or IPE sends a Create request targeting the URI of the virtual resource, the resource definition name with its version, and "/activate" at the end of the URI. Alternatively, the "activate" attribute could be targeted if the resource definition was created in the SL resource tree. The request triggers the activation procedure within the service layer. The resource definition file provides the criteria for activation. These criteria are then read by the service layer to determine what actions are to be taken. Some of the actions may depend on other actions performed beforehand. For example, extracting the schema document from the resource definition document should be performed before validating that the schema document is well formed. As a result, the contents of the activation criteria section of the resource definition document should have stringent guidelines and validations before resource definition registration is accepted.

In step 2, the service layer can optionally send a request to an authorization server to check if the application or IPE can activate the resource definition. Depending on the size and complexity of the service layer, this request could be sent to a third party or the service provider's authorization server. Alternatively, it could be evaluated within the service layer based on some policy or configuration parameter. This authorization check can also be performed when the activation procedure is triggered by the creation of a resource instance that provides a URI to the schema document, and new authorization parameters may be added to specify the required authorization checks.

In step 3, the authorization server responds with an appropriate message. If the response indicates that the application or IPE does not have authorization, then the service layer will stop the activation process and respond accordingly in step 7.

In step 4, if the application or IPE is authorized, the service layer integrates the resource definition into the server's operations. This could entail extracting the schema file from the resource definition document and verifying that the resulting file is well formed. Alternatively, a database of valid resource definition files could be updated to include the new resource definition. In addition, updates could be made to expose the new resource type for discovery purposes.

In step 5, once the service layer has validated that the schema document is well formed, it can then save the document to its internal repository for future use. For example, the service layer may verify that the schema document conforms to the defined syntax rules of the XML 1.0 specification, which specifies that XML, documents must satisfy certain physical and logical structures in order to be well formed.

In step 6, a status is returned on the integration of the schema document into the service layer operation.

In step 7, the service layer returns an appropriate response to the activation request. If any of the activation processes/procedures failed, the response may indicate which processes/procedures failed to help the application/IPE debug the failing part(s).

Resource Definition Deactivation

Figure 12:
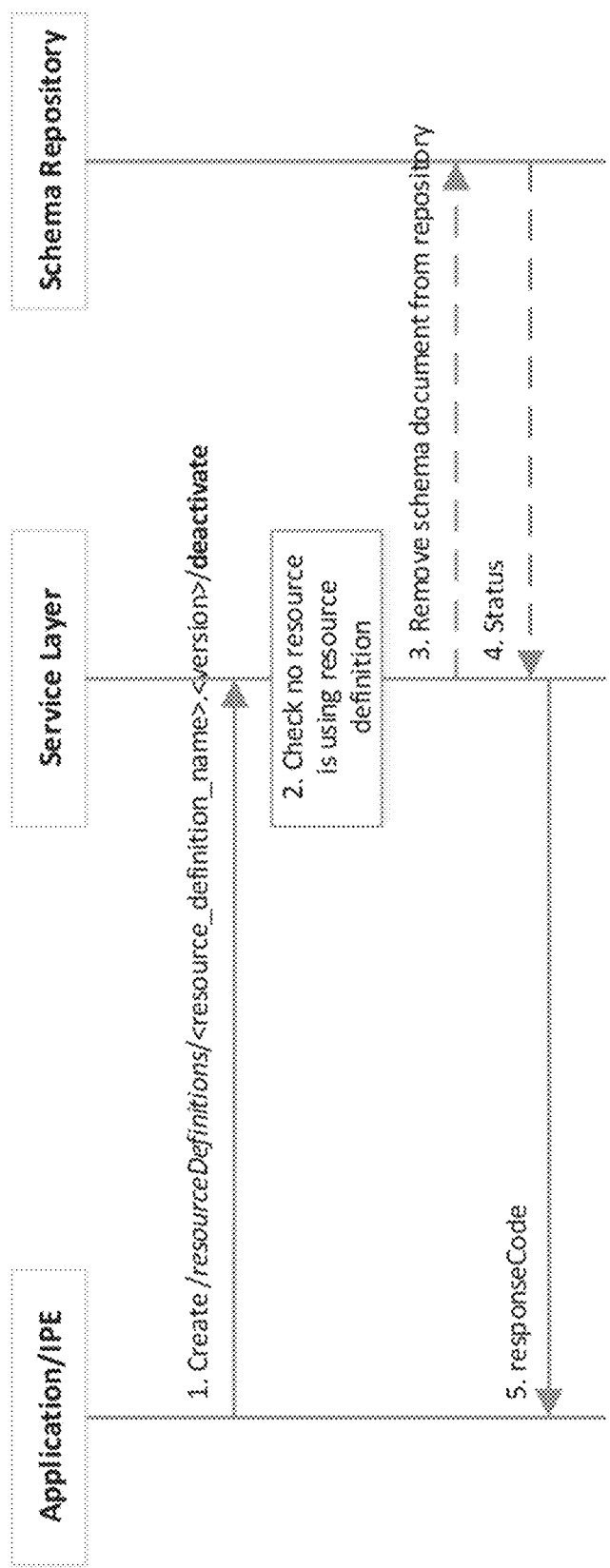
FIG. 12 shows an example service layer resource definition deactivation procedure.

Resource definition deactivation is simpler than activation since the process only requires the service layer to ensure no resources exist in the resource tree that use the targeted definition. This is to ensure that the definition is available should the service layer need to validate any future requests targeting the resource definition. If no resources in the service layer resource tree use the definition, then the SL can deactivate the resource definition. FIG. 12 shows some possible actions resulting from the deactivation process, as discussed below.

In step 1, an application or IPE determines that a resource definition is no longer needed due to the absence of any resource instances existing in the SL of that type. A request is sent to the service layer targeting the resource definition with its version and appending "/deactivate" at the end of the target URI. Alternatively, the "deactivate" attribute could be targeted if the resource definition was created in the SL resource tree.

In step 2, the service layer checks its own resource tree to ensure no existing resource instance is using the resource definition. If there are pending resource instances that use the resource definition, the deactivation request is denied. If there are no resource instances in use, then the service layer deletes the resource definition.

In step 3, the service layer can remove the schema document from its internal repository and remove the resource type from being discovered.

In step 4, a status is returned for the removal of the schema document.

In step 5, the service layer returns an appropriate response code for the deactivation request.

SL Data Model Mapping Document Registration Procedure

After a resource definition has been activated, an IPE, a managing application, or a server administrator can then register the data model mapping document to the service layer. The data model mapping document provides retargeting indicators that describe how a service layer should retarget the requests to the interworked service layer resources. The data model mappings also are used in protocol translation. It is important that the resource definition was first activated so the service layer can process the data model mappings provided in this registration request against the generated schema file from the resource definition. The data model mapping document should contain the full listing of resource specific attributes provided in the generated schema document. In addition, the document will contain associated URIs of the interworked data model for each SL resource specific attribute. Some examples of the data model mappings (without retargeting indicators) can be found in TS-0005 for LWM2M. The data model mapping document provides one-to-one correspondence between the service layer resource specific attributes and the interworked data model resource URIs.

The IPE is provisioned with a data model mapping document that contains the same list of resource specific attributes as those in the resource definition document. Only the names of the resource specific attributes are kept while new parameters are added to the data model mapping document. Some of the new parameters include the resource URI of the interworked data model with the associated data types and a retargeting indicator. Other parameters can be included to account for additional features of the IPE. The resource URI is used during protocol translation to map from service layer resource attributes to third party resources and vice versa while the retargeting indicator parameter will be described in more detail below.

Once the IPE is provisioned with the data mapping document, it may process the document further to generate a copy for use in registering to the service layer. This may involve changing the retargeting indicator (or other parameters) as described below based on the capabilities of the IPE. In that case, the data model mapping document used by the IPE will be different than the document that is registered to the service layer.

Note that the contents of the resource definition and data model mapping documents can be combined together into one document. In this scenario, the procedures described above still apply but will now apply to the composite document, which contains both the resource definition and the data model mapping information. As a result, the procedures for resource definition registration and management are combined with those of data model mapping registration and management. The resource definition document will contain data model mapping information as well, and the service layer can save the new information in the schema document or separate them as two documents. The data model mapping information can be made optional to support the case where new service layer resource types or modified resource type resource definitions are registered and interworking is not required.

Figure 13:
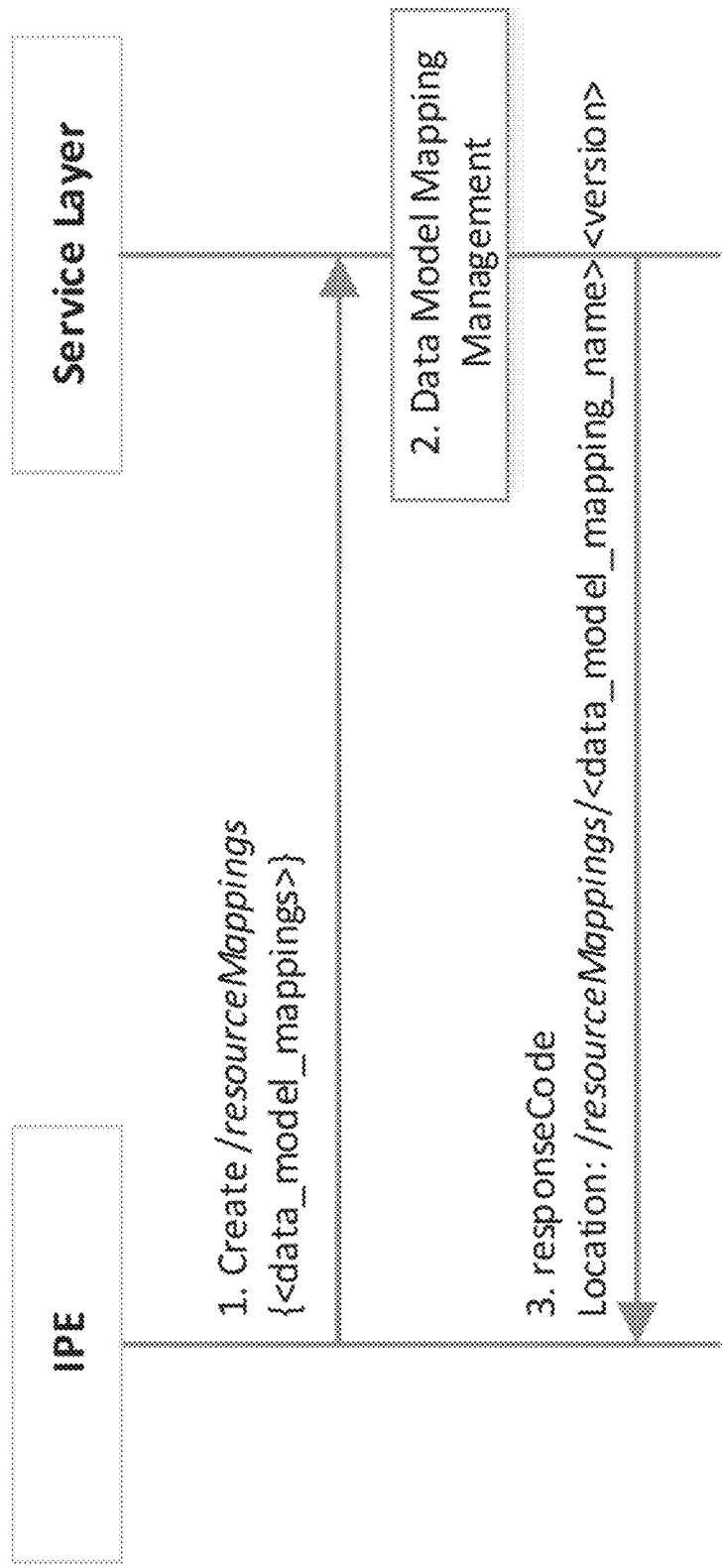
FIG. 13 shows an example service layer data model mapping document registration procedure.

FIG. 13 shows an exemplary registration procedure of the data model mapping document to the service layer, as discussed below.

In step 1, an IPE sends a Create request targeting a virtual resource "/resourceMappings" to indicate the registration is one for a resource mapping. The complete resource mapping document is added to the payload of the message.

In step 2, the service layer verifies that the resource attribute names and associated data types in the mappings document provided by the request match those in the corresponding schema document. This check ensures that all resource specific attributes are mapped to some interworked data model resource. Note also that the mapping management is done behind the scenes and no service layer resources are created in the resource tree. Instead, the mappings are saved to a file for use by the service layer when retargeting a future interworking request.

In step 3, if the creation was successful, the service layer returns an appropriate response with the location of the resource mapping document and the associated version number.

The management procedures for the data model mappings follow those of resource definitions as described above except for the change in the target URI. Instead of using "/resourceDefinitions", the target URI will be "/resourceMappings" instead. The discovery criteria for data model mapping is a subset of those used for resource definitions. Finally, the data model mappings do not need to be activated or deactivated as they work in conjunction with the resource definitions. If the resource definition document and the data model mapping document are combined, then only one set of management procedures are needed for the composite document.

Interworking Retargeting Indicators

In addition to providing the URIs of the interworked resources, the data model mapping may also contain a retargeting indicator for each mapped resource. This indicator may provide guidance to both the IPE and the service layer on when to retarget a retrieve request based on the retargeting indicators provided for each mapping. For create, update, and delete requests, they are always retargeted to ensure synchronization between the SL resource and the resource on the interworked device. Table 3 shows examples of retargeting indicators, in accordance with one embodiment. In other embodiments, more or less retargeting indicators may be supported. Use of these retargeting indicators can help free the service layer from performing unnecessary retrieve requests for data that is static or semi-static in nature.

TABLE 3

Interworking Retargeting Indicators

| Retargeting Indicator | Description of Use |
| --- | --- |
| 0 (One-time retarget) | The interworked resource is static in nature and only needs to be retrieved once initially. Once the SL layer retrieves the resource, the value will never change and the SL can cache/save it for future use. Examples include the manufacturer and model of a device. |
| 1 (Always retarget) | The interworked resource changes dynamically and must always be retargeted to obtain the latest value. This indicator is used to force retargeting to occur in order to get the latest value from the interworked resources. |
| 2 (Retarget on change) | The interworked resource is semi-static in nature and will only change whenever an operation occurs. This indicator is used for example when a firmware on a device is updated and the firmware version needs to be updated. Associated with the retargeting indicator is a URI to the resource that when modified, would require a retargeting operation to be performed to obtain new data. For example, a command to update firmware on a device would require a retarget operation to be performed to retrieve the new firmware version. The retargeting indicator for the firmware version resource will be set to "Retarget on change" and the corresponding URI will point to the firmware update resource. |
| 3 (Periodic retarget) | The interworked resource changes in a periodic nature and only needs to be retargeted beyond the specified time. This indicator is used when sensors are programmed to have periodic sleep states or only generate measurements periodically. It could also be used for refreshing registration lifetimes of devices. |

The retargeting indicators provided in Table 3 may be used by the IPE to manage the interworked resources hosted on the service layer. The mapping document that is registered to the service layer may only contain two indicators: one-time retarget and always retarget. For retarget indicators 2 and 3, the capability of the IPE will determine whether the indicators are independently changed from 2 or 3 to either 1 or 0. If the IPE is integrated with the third party server that manages the interworked device, then the IPE may know when an attribute with retarget indicator 2 is changed and make the corresponding update to the SL resource. Likewise, if the IPE supports periodic refresh, then it can keep an attribute with retarget indicator 3 updated in the SL resource. In both cases, the IPE is dynamically updating resource attributes in the service layer to ensure freshness and is configuring those attributes to one-time retarget in the data model mapping document. If the IPE only supports one of the two capabilities, then only the attributes associated with that capability will be configured to one-time retarget. Attributes whose retargeting indicator requires features that are not supported by the IPE will be configured to always retarget.

The retargeting indicator is provided as part of the data model mapping document that applies to a particular resource type. This will ensure consistent retargeting indicators for all devices that use the same resource type. However, the retargeting indicator can be expanded for use in a more generic fashion based on each resource instance. This provides for more granular retargeting control at the resource instance level. Each resource instance and the corresponding interworked resource may have its own retargeting indicator independent of resource type. For example, two sensors may use the same resource type to provide temperature readings but for different applications. One sensor, which is located in a home, requires temperature readings every 30 minutes. The second temperature sensor is located in a chemical processing laboratory which requires readings every minute. When the associated temperature resource instance is created, each will be configured for "Periodic retargeting", but will have different periods specified.

Even though the retargeting indicator is proposed for use in interworking, the concepts could also be applied to existing service layer retargeting. For example, new retargeting indicator attributes like those described in Table 3 could be added to announced resources to direct a service layer on when to retarget.

Service Layer Generic Interworking Procedure

In accordance with the third aspect disclosed herein, after both the resource definition and resource mapping documents are registered, SL applications can make requests on the interworked resources after they are created. SL applications can use resource discovery to find the interworked resources just like other SL resources. After discovery, applications can perform RESTful operations on the interworked resource and get responses as with other SL resources. For example, a RESTful resource may be a uniquely addressable element in a Resource Oriented Architecture (ROA) having a representation that can be manipulated via RESTful methods. When a request is made targeting an interworked resource, a generic SL interworking procedure may be triggered between the service layer and the IPE. This procedure, discussed further below, is outlined in the example of FIG. 14.

Figure 14:
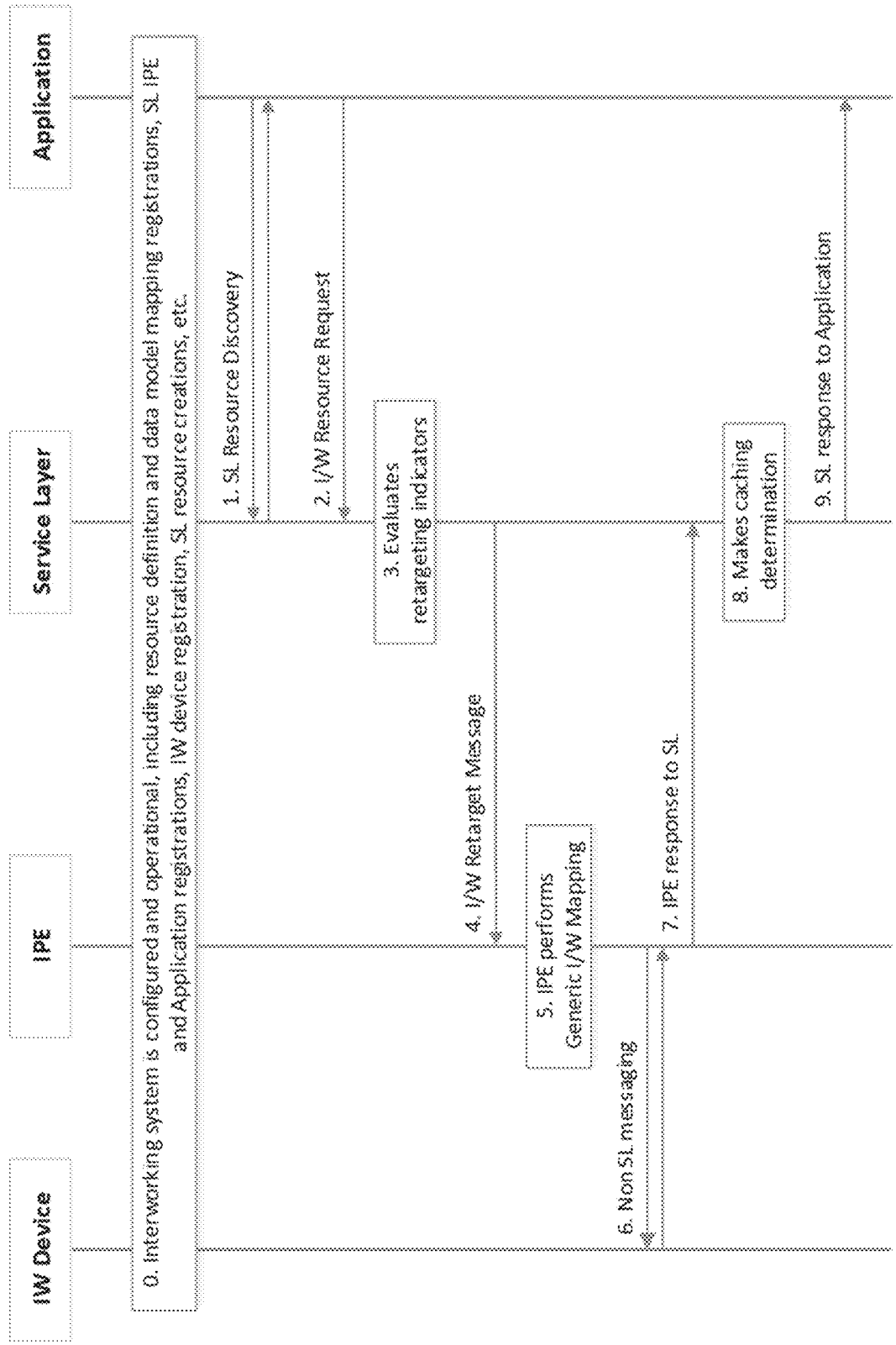
FIG. 14 shows an example generic service layer interworking procedure.

With reference to FIG. 14, in step 0, the interworking system is configured and operational. This includes resource definition and data model mapping registrations, SL registrations of the IPE and Application, IW device registration to the IPE, the IPE creating the interworked resources and the associate subscriptions on the service layer, and all other configurations necessary to enable communications among the different actors.

In step 1, an application performs service layer resource discovery and finds the interworked resource it is looking for.

In step 2, a request is made targeting the interworked resource in the service layer.

In step 3, the service layer evaluates the retargeting indicator of the targeted interworked resource and makes a determination on whether to retarget the request to the IPE using the data model mapping document. For retrieve requests of one-time retargeting attributes, the SL returns the value of the attribute in step 9 that may have been cached if one exists from a previous retargeted request. If no cache value is found, then a retargeted request is made to fetch the value from the interworked device. For all other requests, the service layer retargets the request and generates a notification message to send to the IPE.

In step 4, notification is sent to the IPE for the requested resource.

In step 5, the IPE extracts the targeted resources from the notification message and uses the data model mapping document to translate the service layer resource to the interworked resource. In addition, the IPE performs protocol translation to create a new request message targeting the interworked resource URI obtained from the data model mapping document.

In step 6, the IPE sends a message in a format that is compliant with the device's technology (e.g. LWM2M, OIC, etc.) to the interworked device and the device returns an appropriate response to the IPE. This step may be a multi-step process if the IPE is not integrated with the third party server that manages the device. There will be message exchanges between the IPE and the third party server, as well as between the third party server and the device. After the IPE receives a response, it will perform reverse protocol translation and data model mapping to create a new response message to the service layer.

In step 7, the IPE sends an appropriate response to the service layer.

In step 8, the service layer makes a determination based on the retargeting indicator whether to cache the corresponding value per interworked resource attribute. If the indicator is set as a one-time retarget, then the service layer will save the information in the response for future use. If another application or even the same application performs a subsequent retrieve for the information saved within the service layer, no retargeting is necessary as the information has already been fetched and the service layer can return the saved information.

In step 9, an appropriate response is returned to the requesting application.

Example oneM2M Embodiments

Figure 15:
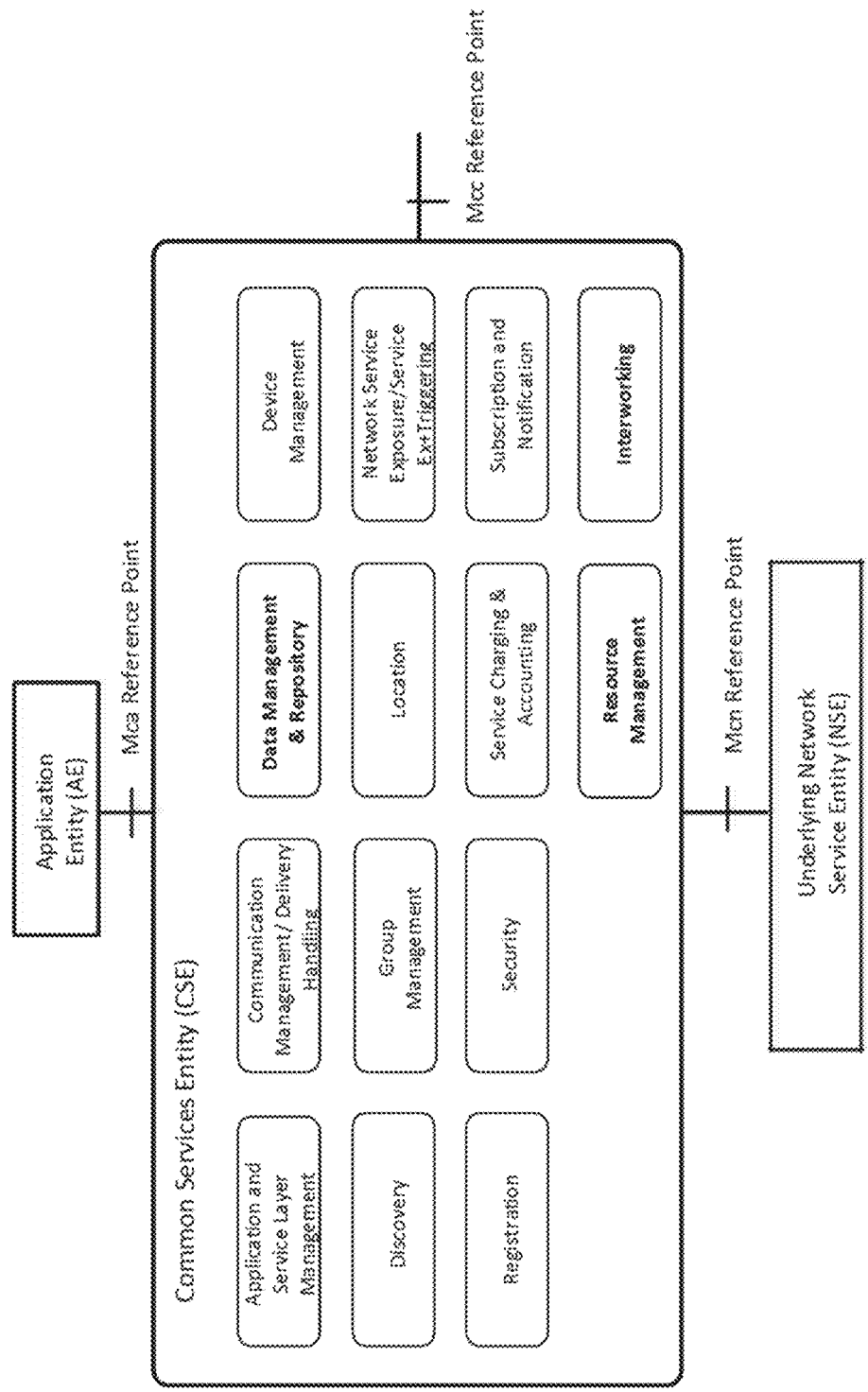
FIG. 15 illustrates an example of creating a new one M2M Common Services Function (CSF) as well as updating an existing CSF.

FIG. 15 shows an exemplary embodiment in which new oneM2M Common Services Functions (CSFs) are created and existing CSFs are updated. A new Resource Management CSF can process both the resource definition and resource mapping registrations and a new Interworking CSF can be used to evaluate the interworked resource's retargeting criteria. Alternatively, a Data Management and Repository could be updated to allow for creating new resource types in place of the Resource Management CSF.

In addition to the CSF changes, new oneM2M resources and/or resource attributes may be added to the service layer. Table 4 shows exemplary new "resources" that can be added to the service layer.

TABLE 4

Examples of new oneM2M Resources

| New Resource Name/Type | Description |
| --- | --- |
| resourceDefinitions | A (virtual or actual) service layer resource where the resource definition repository is accessed. If the resource is virtual, it will serve as the entry point to manage the resource definitions. If the resource is an actual resource, it will serve as the collection of resource definitions. This is the target URI used when managing resource definitions. |
| resourceMappings | A (virtual or actual) service layer resource where the resource mapping repository is accessed. If the resource is virtual, it will serve as the entry point to manage data model mappings. If the resource is an actual resource, it will serve as the collection of data model mappings. This is the target URI used when managing data model mappings. |
| activate | This could be a virtual resource or an attribute of an actual resourceDefinition resource and is used to trigger the activation process of resource definitions. When it is a virtual resource, it is appended to resourceDefinitions to trigger the activation process. When it is an attribute, it is defined as an executable attribute that, when updated, triggers the activation process. |
| deactivate | This could be a virtual resource or an attribute of an actual resourceDefinition resource and is used to trigger the deactivation process of resource definitions. When it is a virtual resource, it is appended to resourceDefinitions to trigger the |

TABLE 4-continued

Examples of new oneM2M Resources

| New Resource Name/Type | Description |
|---|---|
| | deactivation process. When it is an attribute, it is defined as an executable attribute that, when updated, triggers the deactivation process. |

Example oneM2M Resource Definition Document

An example of a resource definition document that could be used within oneM2M is shown in FIG. 16. This document shows the five main sections of the resource definition document: resource definition information, service layer resource attributes, resource specific attributes, child resources of the interworked resource, and the activation criteria. Note that within the resource specific attributes, the dmServerInfoAnnc element tag has been condensed into a single line to fit the entire document within the figure.

Specifically, the document shown in FIG. 16 depicts an example resource definition for the LWM2M Server Info object. At the top, various resource information is provided to identify the resource by name and type and to provide meta-data about the resource such as version number, short name, resource label, and where in the resource tree the resource can exist. The sections Resource Attributes, Resource Specific Attributes, and Child Resources comprise the contents that go into a oneM2M XSD file. Finally, the Activation Criteria section provides instructions to the service layer on how to activate the definition document to enable the use of the resource.

Although the resource definition document is used as part of interworking support, it could also be used in normal service layer operations to register new resource types or resources based on existing types. For example, a service layer that is deployed with version 1.0 of a certain resource type can be upgraded to support version 1.1 of the same resource in the future using the ideas presented above. The resource can also be a service layer only resource that does not need a data model mapping document. This is why the resource definition document and the data model mapping document are registered separately and only the resource definition needs to be activated. In addition to supporting different versions of the same resource, the service layer can also support custom resources created by a service layer owner, as in the case of a localized service layer deployment in home automation.

Example oneM2M Data Model Mapping Document

The data model mapping document is generated by extracting the information in the Resource Specific Attributes section of the resource definition document, keeping the name parameter, and adding targetURI and retargetLevel parameters for each resource specific attribute. FIG. 17 shows an example of the data model mapping document for the LWM2M Server Information object in XML format. Other formats such as plain text, JSON, CoRE Link format, etc. could also be used. Note that the Resource Specific Attributes section of the resource definition document in FIG. 16 and the data model mapping document in FIG. 17 are similar (e.g., they both contain the same resource specific attributes).

The example data model mapping document shown in FIG. 17 is used by the IPE during protocol translation. This document uses all the retargeting indicators specified by Table 3. As previously stated, the data model mapping document that is registered to the service layer will only contain two indicators: one-time retarget and always retarget. As a result, the IPE generates a new data model mapping document for use in registering to the service layer. This new document will change retargeting indicators 2 and 3 to either 0 or 1 based on the capability of the IPE. The example in this case has the IPE and the third party server as separate entities, with the IPE supporting only periodic retargeting.

FIG. 18 shows an example data model mapping document that the IPE registers to the service layer. Since the IPE supports periodic retargeting, the lifetime attribute's retargeting level is set to 0 (one-time retarget). The IPE supports this capability and will dynamically update this resource attribute so the service layer will always have the latest value. For other attributes in FIG. 17 with a retargeting indicator of 2 (retarget on change), the IPE does not support this feature. Thus, those values are set to 1 (always retarget).

Example Call Flows

As discussed above, tremendous value may be added to service layer deployments by providing the flexibility to support dynamic resource management for interworking resources from different systems and from vendors of different vertical markets or even the same vertical market. In addition, existing service layer resources (e.g., <mgmtObj> and <flexContainer>) can be customized for the service layer service provider or owner. A number of these advantages are demonstrated in the oneM2M <mgmtObj> and <flexContainer> interworking examples, multiple vendor interworking example and LWM2M interworking example discussed below.

oneM2M <mgmtObj> XSD Activation Example oneM2M's <mgmtObj> resource provides the ability to create specialized resources for use in device management (e.g., LWM2M) through the objectAttribute attribute. This is a customizable attribute that could be used for mapping directly to data model resources of the underlying device management technology. The mgmtDefinition and objectIDs attributes define what type of specialization object the <mgmtObj> resource is customized for. Currently, these attributes are defined within the standardization process and therefore do not offer the flexibility to dynamically define new specializations.

Using the ideas presented above, the current oneM2M <mgmtObj> resource may be updated to dynamically support new specialization resources. Table 5 shows the resource specific attributes for the <mgmtObj> resource as well as the proposed change to the objectIDs attribute in order to support dynamically defining new specialization resources. The change expands on the definition of the <mgmtObj> resource to modify the objectIDs attribute to provide either a URN or a URI for the XSD of the specialized <mgmtObj> resource that corresponds to a LWM2M Object definition. The objectIDs may be specified during the creation of the specialized <mgmtObj> resource. The option to specify a URI in the objectIDs attribute allows the CSE to support new LWM2M Objects that were not available at the time of initial deployment of the CSE. This is especially true in the case of vendor specific LWM2M Objects. The URI will point to a location where the XSD of the new specialized <mgmtObj> resource can be found and retrieved for the CSE to use.

TABLE 5

<mgmtObj> Resource Specific Attributes

| Attributes of <mgmtObj> | Multiplicity | RW/ RO/ WO | Description | <mgmtObjAnnc> Attributes |
|---|---|---|---|---|
| mgmtDefinition | 1 | WO | Specifies the type of <mgmtObj> resource (e.g., software, firmware, memory). The list of the value of the attribute can be seen in annex D. | MA |
| objectIDs | 0 . . . 1 (L) | RW | Contains the list URNs or a URI of an XSD file that uniquely identifies the technology specific data model objects used for this <mgmtObj> resource as well as the managed function and version it represents. This attribute may be provided during the creation of the <mgmtObj> resource and may not be modifiable afterwards. If the <mgmtObj> resource is mapped to multiple technology specific data model objects, this attribute may list all URNs for each mapped technology specific data model object. This is mandatory for the <mgmtObj>, for which the data model is not specified by oneM2M but mapped from technology specific data model. | OA |
| objectPaths | 0 . . . 1 (L) | RW | Contains the list of local paths of the technology specific data model objects on the managed entity which is represented by the <mgintObj> resource in the Hosting CSE. This attribute may be provided during the creation of the <mgmtObj> so that the Hosting CSE can correlate the created <mgintObj> with the technology specific data model object on the managed entity for further management operations. It may not be modifiable after creation. The format of this attribute may be a local technology specific data model object path in the form as specified by technology specific protocol. (e.g., "./anyPath/Fw1" in OMA DM [i.3], "Device.USBHosts.Host.3." in BBF TR 069 [i.2]). The combination of the objectPaths and the objectIDs attribute allows to address the technology specific data model. | OA |
| mgmtLink | 0 . . . 1 (L) | RW | This attribute contains reference to a list of other <mgmtObj> resources in case a hierarchy of <mgmtObj> is needed. | OA |
| [objectAttribute] | 0 . . . n | RW | Each [objectAttribute] is mapped from a leaf node of a hierarchical structured technology specific data model object (including oneM2M data model and the technology specific data model objects) based on the mapping rules presented below. | OA |
| description | 0 . . . 1 | RW | Text format description of <mgmtObj>. | OA |

Figure 19:
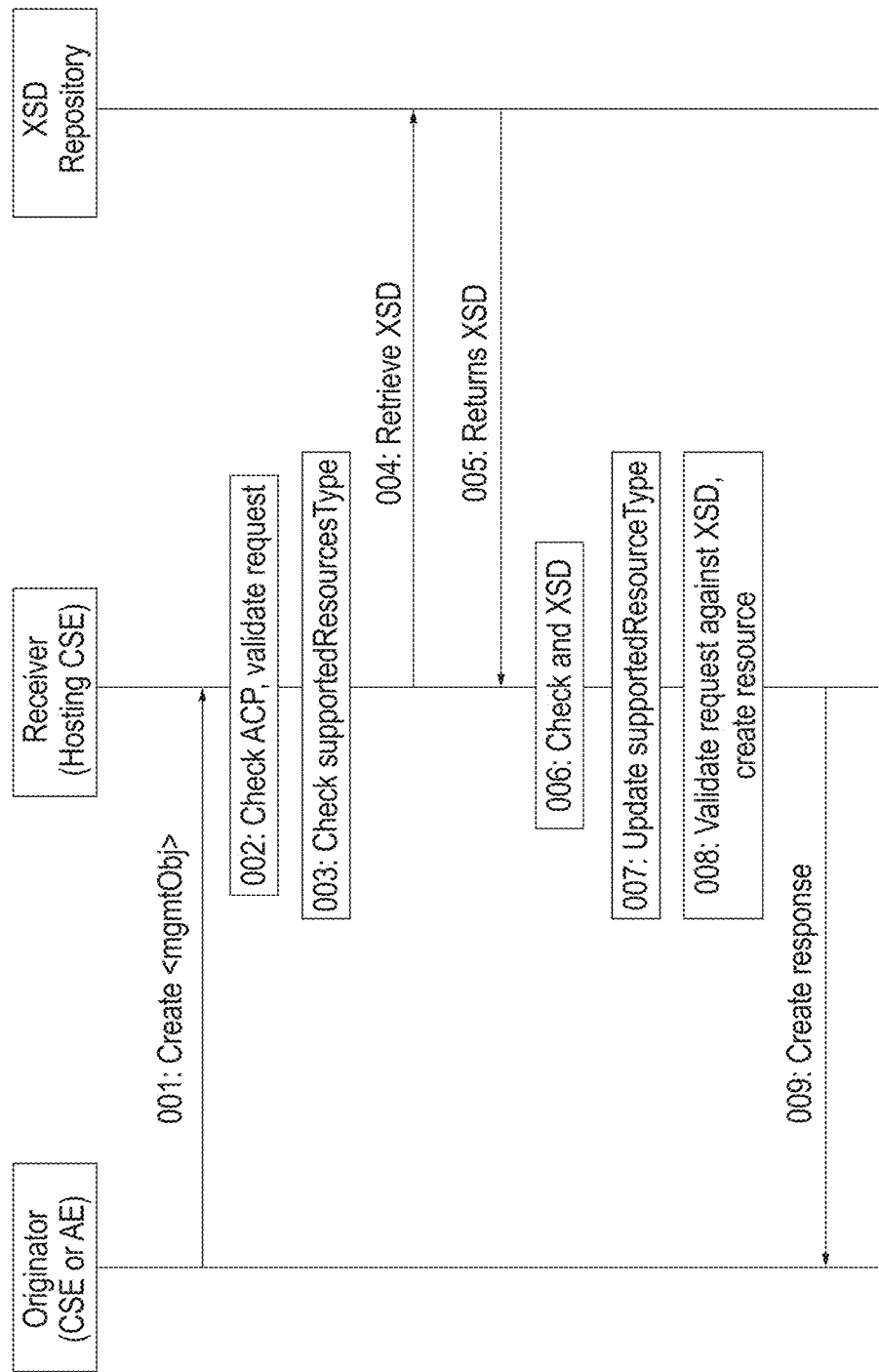
FIG. 19 shows an example procedure for oneM2M CSE to support new specialized <mgmtObj> resources.

FIG. 19 shows an updated procedure a oneM2M Hosting CSE executes to create a new, specialized <mgmtObj> resource using the objectIDs attribute.

In step 001, the Originator sends mandatory parameters and may send optional parameters in the Request message for a CREATE operation of a specialized <mgmtObj> resource. The specialized <mgmtObj> resource contains a full mapping of the underlying LWM2M Object and includes the URI of the XSD for the new specialized resource in the objectIDs attribute.

In step 002, the Receiver:
  Checks if the Originator has the appropriate privileges for performing the request; and
  Verifies that the name for the created resource as suggested by the resourceName attribute in Content parameter does not already exist among child resources of the targeted resource.

In step 003, the Receiver checks if the specialized <mgmtObj> resource is found in the supportedResourceType attribute of the CSEBase. If the specialized <mgmtObj> resource is found in the supportedResourceType attribute, go to Step 8; otherwise, go to Step 4.

In step 004, the Receiver extracts the contents of the objectIDs attribute and retrieves an XSD from the XSD Repository.

In step 005, the XSD Repository returns the XSD for the specialized <mgmtObj> resource.

In step 006, the Receiver checks that the received XSD is well formed and if it is, saves the XSD to the Receiver's local XSD repository.

In step 007, the Receiver updates the supportedResourceType attribute with the name of the specialized <mgmtObj>.

In step 008, the Receiver completes processing the CREATE request. This may include:
  Assigning a Resource-ID to the resource to be created;
  Assigning values for mandatory RO (Read Only) mode attributes of the resource and overriding values provided for other mandatory attributes where allowed by the resource type definition and if not provided by the Originator itself.
  The Receiver assigns a value to the following common attributes:
    parentID;
    creationTime;
    expirationTime: if not provided by the Originator, the Receiver assigns the maximum value possible (within the restriction of the Receiver policies). If the value provided by the Originator cannot be supported, due to either policy or subscription restrictions, the Receiver will assign a new value;
    lastModifiedTime: which is equal to the creationTime; and
    Any other RO attributes within the restriction of the Receiver policies.
  The Receiver checks whether a creator attribute is included in the Content parameter of the request. If included, the creator attribute may not have a value in the Content parameter of the request. On the other hand if the creator attribute is not included in the Content parameter of the request, then the Receiver may not include the creator attribute in the resource to be created.
  Upon successful validation of the Create Request, the Receiver creates the requested resource; and
  The Receiver checks if the created child resource leads to changes in its parent resource's attribute(s). If so, the parent resource's attribute(s) are updated.

In step 009, the Receiver responds with mandatory parameters and may send optional parameters in Response message for CREATE operation.

General Exceptions:
  The Originator may not have the privileges to create a resource on the Receiver. In such a case, the Receiver may respond with an error.
  The resource with the specified name (if provided) already exists at the Receiver. In such a case, the Receiver may respond with an error.
  The provided information in Content is not accepted by the Receiver (e.g., missing mandatory parameter). In such a case, the Receiver may respond with an error.

oneM2M LWM2M Interworking Example

Figure 20:
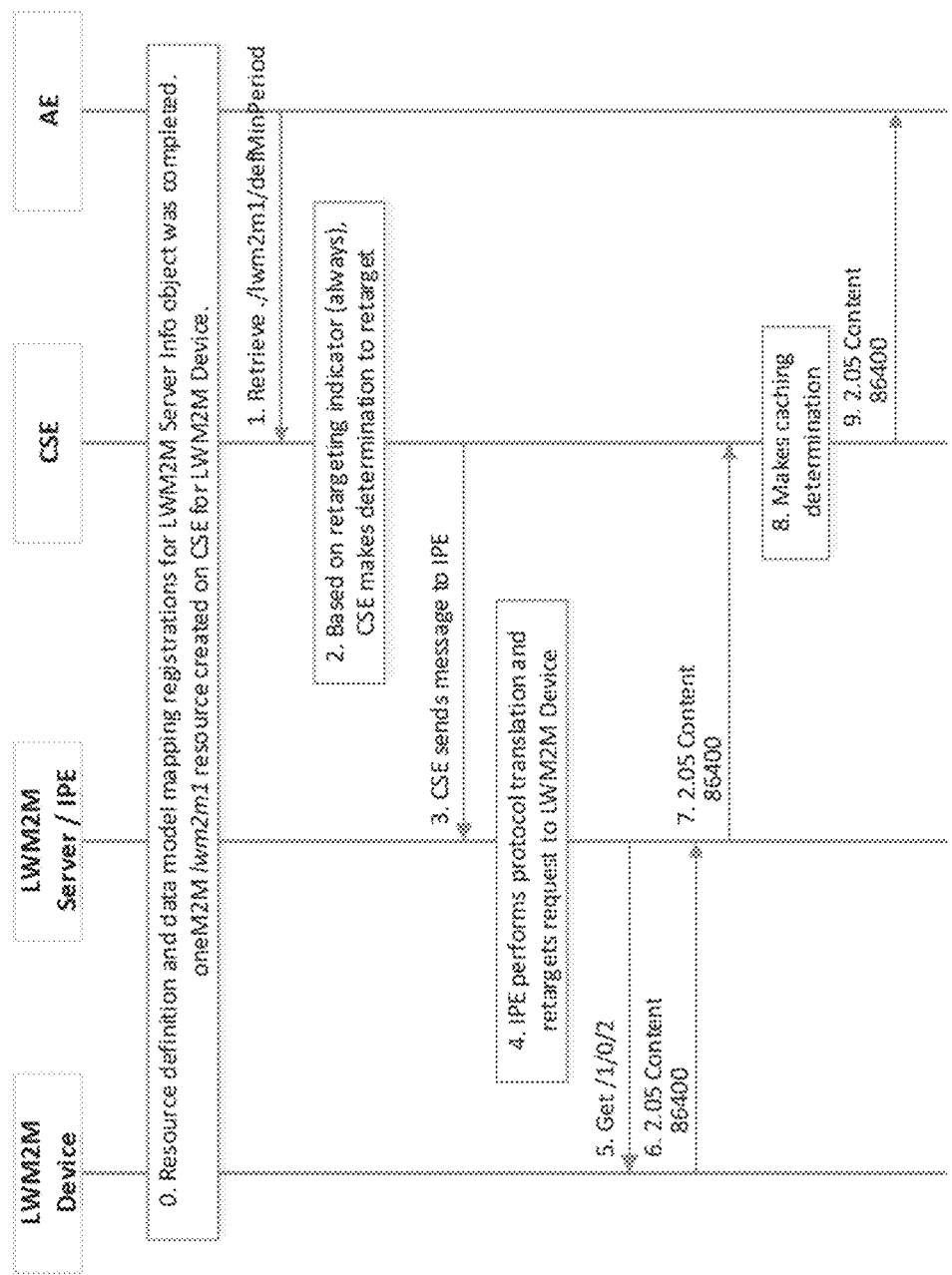
FIG. 20 illustrates an example generic interworking procedure.

FIG. 20 shows an exemplary generic interworking procedure as specified in FIG. 14 as applied to a retrieve of the defMinPeriod attribute of the LWM2M Server Info object resource. FIG. 16 provides the resource definition for the CSE to recognize and allow a LWM2M Server Info resource to be created and accessed. FIG. 18, on the other hand, provides the retargeting indicators for the attributes of the LWM2M Server Info resource as well as the data model mapping information used for protocol translation. Note that only pertinent information is included in the call flow to highlight the data model mapping and protocol translation aspects of FIG. 14.

In step 0, the interworking system is configured and operational. This includes resource definition and data model mapping registrations for the LWM2M Server Info object, LWM2M Device registration to LWM2M Server/IPE, registration by the IPE of the LWM2M Device to the CSE and creation of the LWM2M Server Info resource (lwm2m1) and the associate subscription, and all other configurations necessary to enable communications among the different actors.

In step 1, an AE performs a retrieve of the defMinPeriod attribute of the LWM2M Server Info resource lwm2m1.

In step 2, the CSE checks the retargeting indicator provided for the defMinPeriod attribute as shown in FIG. 18. Since the retargeting indicator is set to 1 (always retarget), the CSE makes a determination to retarget the request.

In step 3, the CSE sends a message to the IPE based on the subscription created. Alternatively, the CSE could also use the pointOfAccess attribute of the AE resource associated with the LWM2M Device to retarget the message or use another mechanism in which the CSE notifies the IPE of the retargeting request.

In step 4, upon receiving the message, the IPE performs protocol translation of the request from the oneM2M protocol to the LWM2M protocol. As part of the protocol translation, a new LWM2M message is created in which the data model mapping is utilized. The defMinPeriod attribute is converted to the LWM2M URI "/1/0/2" based on the mappings shown in FIG. 18. In this case, the "0" is the instance number associated with the lwm2 ml resource. This number was provided by the IPE when the lwm2 ml resource was created.

In step 5, the IPE/LWM2M Server then sends the newly created message to the LWM2M Device. The message "Get /1/0/2" is the LWM2M request to retrieve the defMinPeriod value.

In step 6, the LWM2M Device returns a "2.05 Content" response code with the appropriate value: 86400.

In step 7, the IPE returns the same value to the CSE after it has converted the LWM2M response to a oneM2M response format.

In step 8, the CSE uses the retargeting indicator for defMinPeriod to determine if the value should be cached for future use. In this case, no caching is necessary as the indicator is set to always retarget.

In step 9, the CSE returns an appropriate response to the AE along with the value 86400.

oneM2M <flexContainer> XSD Activation Example

Figure 21:
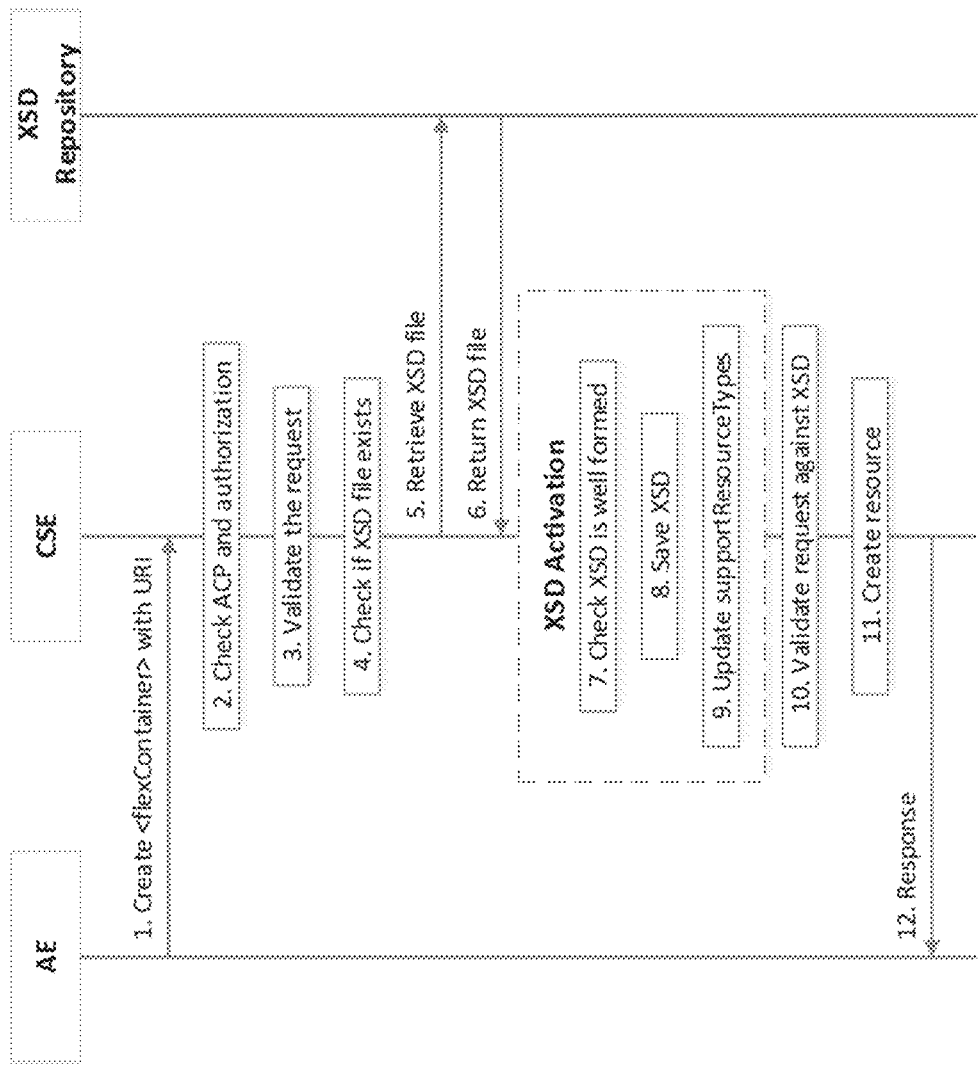
FIG. 21 shows a <flexContainer> working example.

A oneM2M <flexContainer> resource provides the ability to specify the location of an XSD file to describe the contents of a new resource derived from the base <flexContainer> resource through the containerDefinition attribute. The oneM2M specification TS-0001, however, does not specify how the CSE processes such a request and has identified a list of the specializations that use the <flexContainer> resource. FIG. 21 provides an example of how the creation of a <flexContainer> resource could be integrated to provide the ability to register and activate new resource definitions based on the <flexContainer> resource. These new resources will still be classified as a <flexContainer> resource type. Thus, a resource definition is not needed.

In step 1, the AE creates a <flexContainer> resource and specifies a containerDefinition attribute with a URI of the location of the XSD file.

In step 2, the CSE performs an access control policy (ACP) check to ensure the AE can create the <flexContainer> resource. In addition, the CSE may also perform an authorization check to make sure the AE can register and activate the XSD file in case it does not exist in the CSE's local repository.

In step 3, if the ACP check was successful, the CSE validates the request to make sure all required information is present in the request. As part of this validation, the CSE checks that the containerDefinition attribute is present.

In step 4, if the validation request from step 3 and the authorization check from step 2 are successful, the CSE checks if an XSD file exists in its local repository that matches the <flexContainer> resource provided in the payload of the request.

In step 5, if no match is found from step 4, then the CSE extracts the URI from the containerDefinition attribute and fetches the XSD file from the XSD repository.

In step 6, the CSE receives the XSD file.

In step 7, as part of the activation procedure, the CSE checks that the XSD file is well formed.

In step 8, the CSE saves the XSD file to its local repository for future use if the XSD file is well formed.

In step 9, the CSE also updates the supportedResourceType attribute at the CSE base resource.

In step 10, the CSE validates the requested resource against the XSD.

In step 11, if all the previous checks were successful, the CSE creates the <flexContainer> resource.

In step 12, the CSE sends an appropriate response depending on the status of the checks in this procedure.

Multiple Vendor Interworking Example

Figure 22:
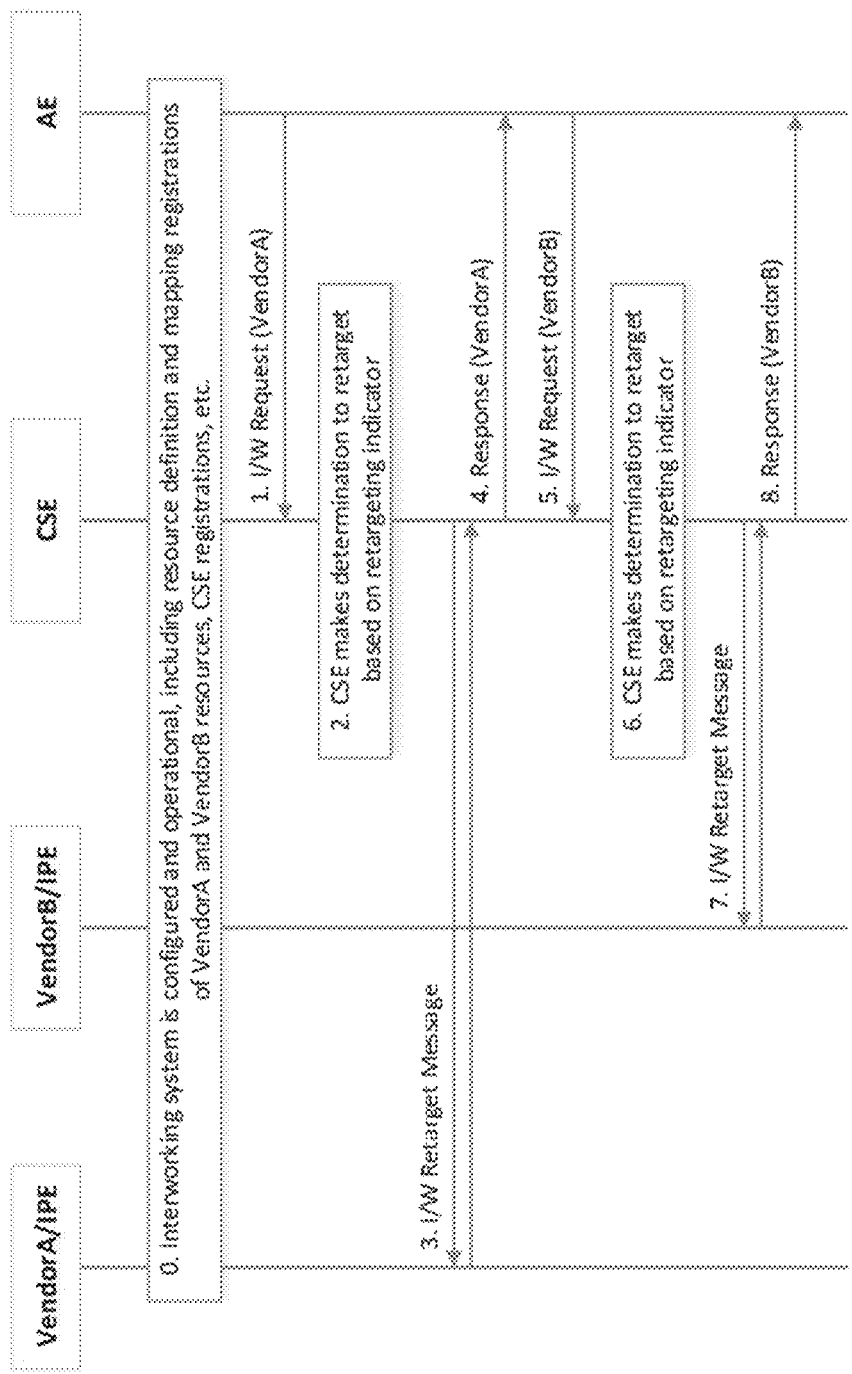
FIG. 22 shows an interworking example involving two vendors.

FIG. 22 shows an example of two vendors that have interworked their devices to the CSE, as discussed below. In doing so, each vendor can offer their services to a common service layer platform and provide for differentiation of their product offerings. An AE can then discover and access those resources to obtain services from each of the vendors without the need to understand each vendor's data model.

In step 0, the interworking system is configured and operational with all CSE registrations (IPEs and AE) completed and successful. Vendors A and B have interworked their resources to the CSE using the resource definition and data model mapping registration procedures. The AE has discovered resources of both vendors and would like to access them.

In step 1, the AE performs a request on a VendorA resource.

In step 2, the CSE checks the retargeting indicators and makes a determination to retarget the request to VendorA/IPE.

In step 3, the CSE sends the retargeted request to VendorA/IPE and receives a response.

In step 4, the CSE returns a response to AE with the data from VendorA's resource.

In steps 5-8, repeat steps 1 to 4 for VendorB's resource.

The example shown in FIG. 22 is very similar to the example presented in FIG. 6, the main difference being that the latter involves interworking between different systems while the former could involve vendors in different fields or even in the same field. In each case, applications can seamlessly access these varying resources using native service layer procedures.

Intelligent Retargeting Interworking Example

Figure 23:
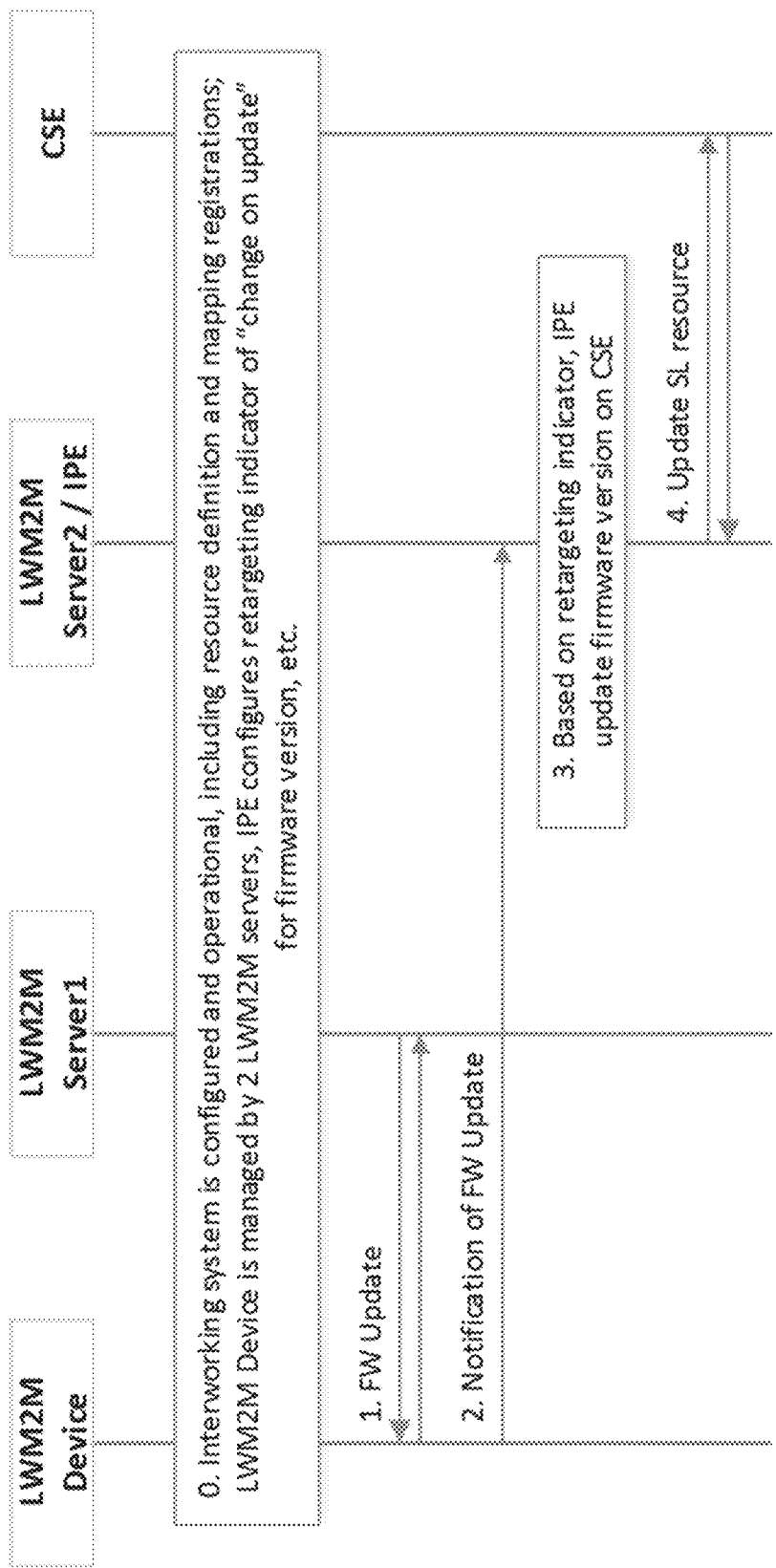
FIG. 23 illustrates intelligent retargeting involving multiple LWM2M servers.

In another example, the LWM2M architecture allows multiple LWM2M servers to manage the same LWM2M client or device. In an interworking scenario, there could be two LWM2M servers managing the same device, one with a traditional LWM2M server and the other with a LWM2M server integrated with an IPE. FIG. 23 shows such an example scenario with LWM2M Server1 being the traditional server and LWM2M Server2 being the interworked server, as discussed below. In this example, both LWM2M servers are actively managing the LWM2M Device. LWM2M Server2/IPE has configured a retargeting indicator of "Change on update" for the firmware version resource of the Firmware Update object. As a result, LWM2M Server2 has made an observe request to get notifications of FW update.

In step 0, the interworking system is configured and operational with all CSE registrations completed and successful. The LWM2M Device is being managed by a traditional LWM2M Server1 and an interworked LWM2M Server2. LWM2M Server2, which is integrated with the IPE, has an observation on the firmware version resource of the LWM2M Device and knows when a firmware update is performed and successful. As a result, the IPE supports keeping the firmware version attribute updated on the CSE and configures the associated data model mapping to one-time retarget.

In step 1, LWM2M Server1 performs a firmware update on LWM2M Device and receives a successful response.

In step 2, LWM2M Device sends a notification to LWM2M Server2 with the new firmware version.

In step 3, the IPE makes a determination to update the firmware version on the CSE based on the retargeting indicator.

In step 4, the IPE updates the firmware version attribute on the CSE with the new version number.

User Interface

FIG. 24 shows an example user interface in which a service layer displays the resource definitions that are registered within the server. Alternatively, this could be displayed by a SL application after discovering the resource definitions and retrieving the LWM2M:1 definition document. The user interface shows a list of resource definitions on the left pane of the window with the definition name and version number along with the logo of the interworked standard. FIG. 24 shows the user selecting the LWM2M:1 resource definition, which is highlighted. On the right pane of the window, the contents of the resource definition for LWM2M:1 are shown. A similar display could be used to show the data model mapping documents.

Example Environment

It is understood that the steps of FIGS. 9-14 and 19-23 may be performed by the respective entities depicted in those figures, which may represent logical entities in a communication network and may be implemented in the form of software (i.e., computer-executable instructions) stored in a memory of, and executing on a processor of, an apparatus of such network, which may comprise one of the general architectures illustrated in FIG. 25C or 25D described more fully below. That is, the operations illustrated in FIGS. 9-14 and 19-23 may be implemented in the form of software (i.e., computer-executable instructions) stored in a memory of a network apparatus, such as for example an apparatus having one of the architectures illustrated in FIG. 25C or 25D, which computer executable instructions, when executed by a processor of the apparatus, perform the steps illustrated in the figure. It is also understood that any transmitting and receiving steps illustrated in FIGS. 9-14 and 19-23 may be performed by communication circuitry (e.g., circuitry 34 or 97 of FIGS. 25C and 25D, respectively) of the apparatus under control of the processor of the apparatus and the computer-executable instructions (e.g., software) that it executes.

Figure 25A:
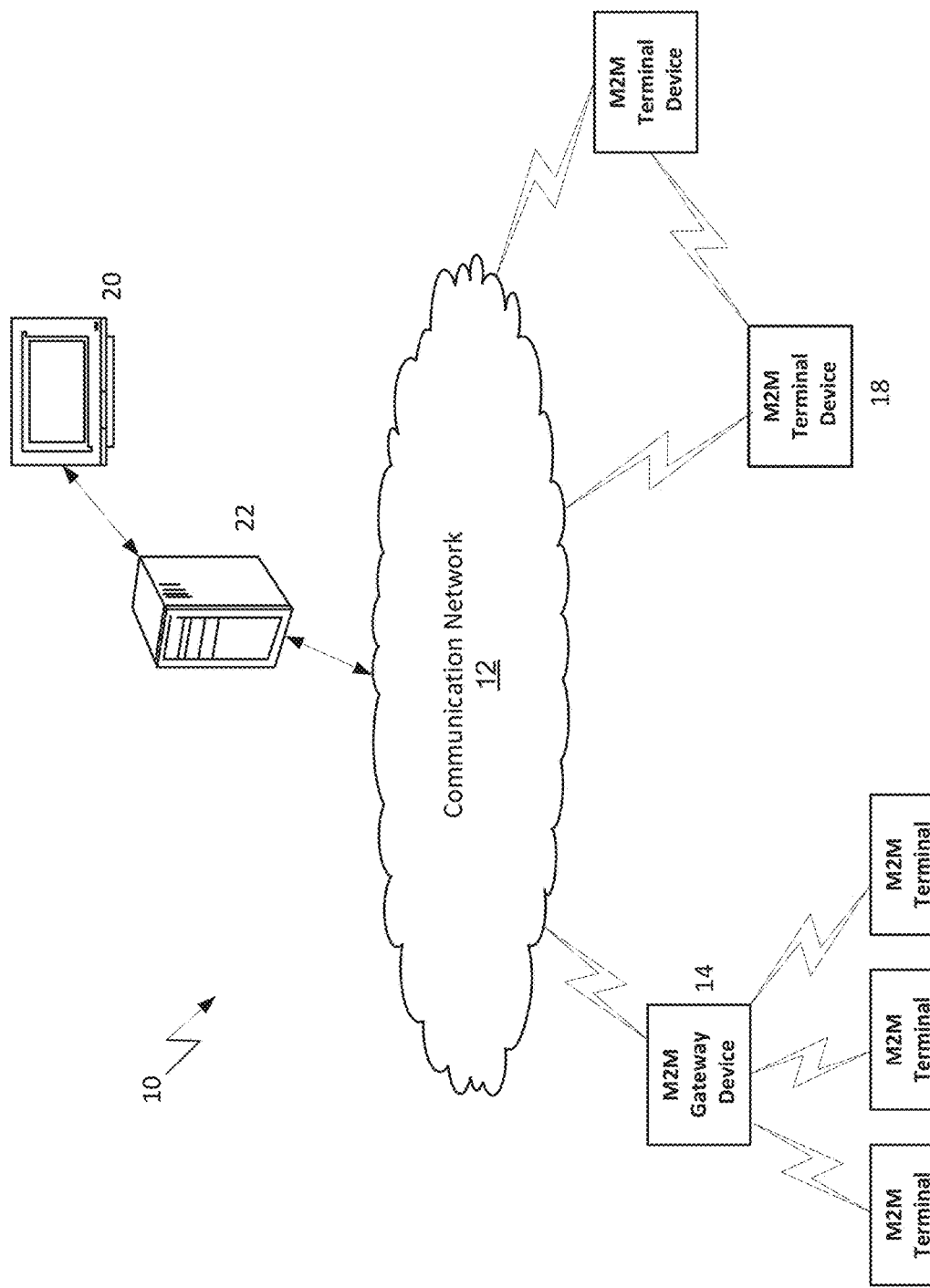
FIG. 25A is a system diagram of an example machine-to-machine (M2M), Internet of Things (IoT), or Web of Things (WoT) communication system in which one or more disclosed embodiments may be implemented.

FIG. 25A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 1, 4-15 and 19-23 may comprise a network apparatus of a communication system, such as the ones illustrated in FIGS. 25A-25D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 25A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 25A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 25B:
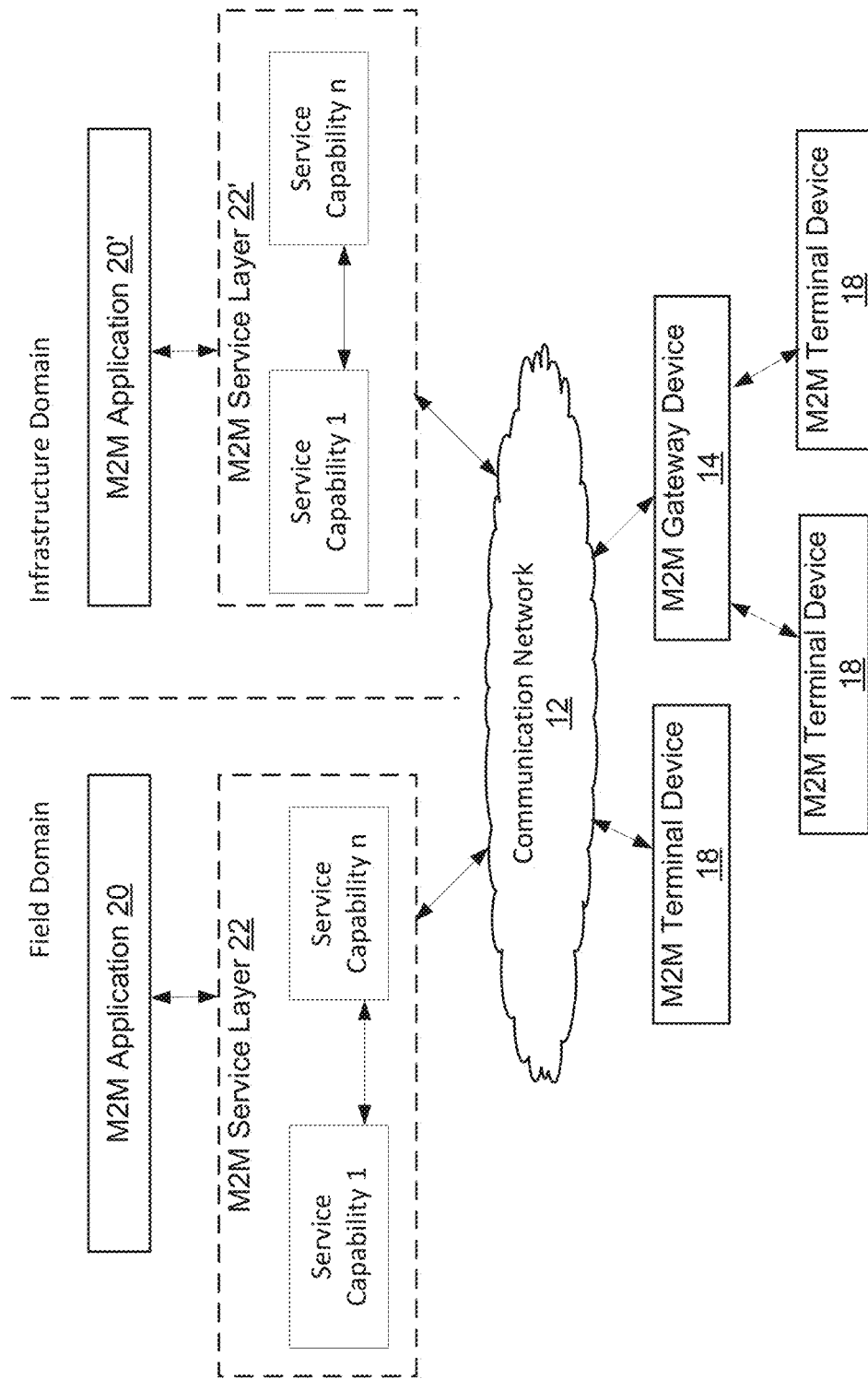
FIG. 25B is a system diagram of an example architecture that may be used within the M2M/IoT/WoT communications system illustrated in FIG. 25A.

Referring to FIG. 25B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 25B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 25B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 25C or FIG. 25D described below.

Further, the methods and functionalities described herein may be implemented as part of an M2M network that uses a Service Oriented Architecture (SOA) and/or a Resource-Oriented Architecture (ROA) to access services.

Figure 25C:
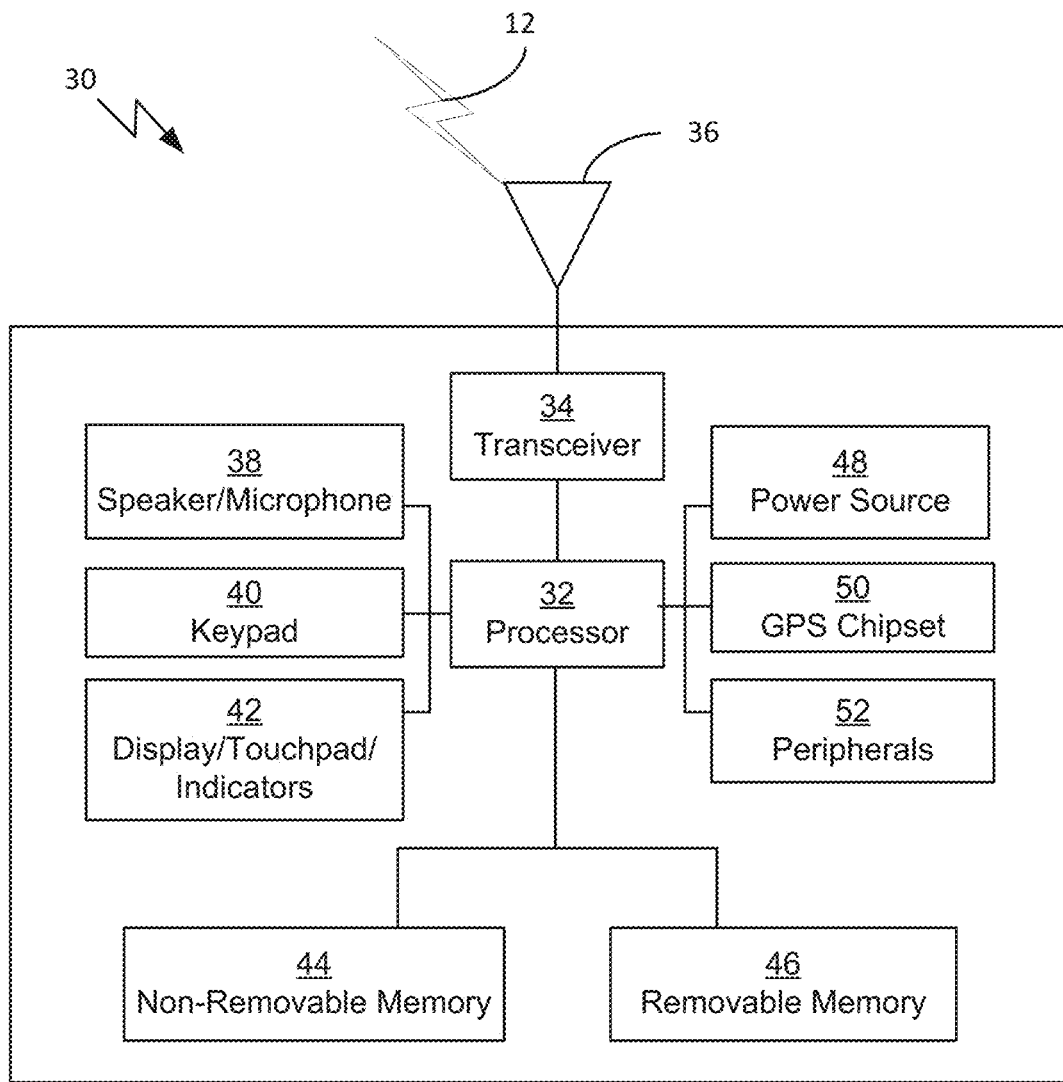
FIG. 25C is a system diagram of an example communication network apparatus, such as an M2M/IoT/WoT device, gateway, or server that may be used within the communications system illustrated in FIGS. 25A and 25B.

FIG. 25C is a block diagram of an example hardware/software architecture of an apparatus of a network, such as one of the entities illustrated in FIGS. 1, 4-15 and 19-23 which may operate as an M2M server, gateway, device, or other network apparatus in an M2M network such as that illustrated in FIGS. 25A and 25B. As shown in FIG. 25D, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the message template management capabilities and methods described herein, such as the methods illustrated and described in relation to FIGS. 9-14 and 19-23.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 25C, the processor 32 is coupled to its communication circuitry (e.g., transceiver 34 and transmit/ receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 9-14 and 24-26) and in the claims. While FIG. 25C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 25C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present the graphical user interface illustrated in FIG. 24 and described herein.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

Figure 25D:
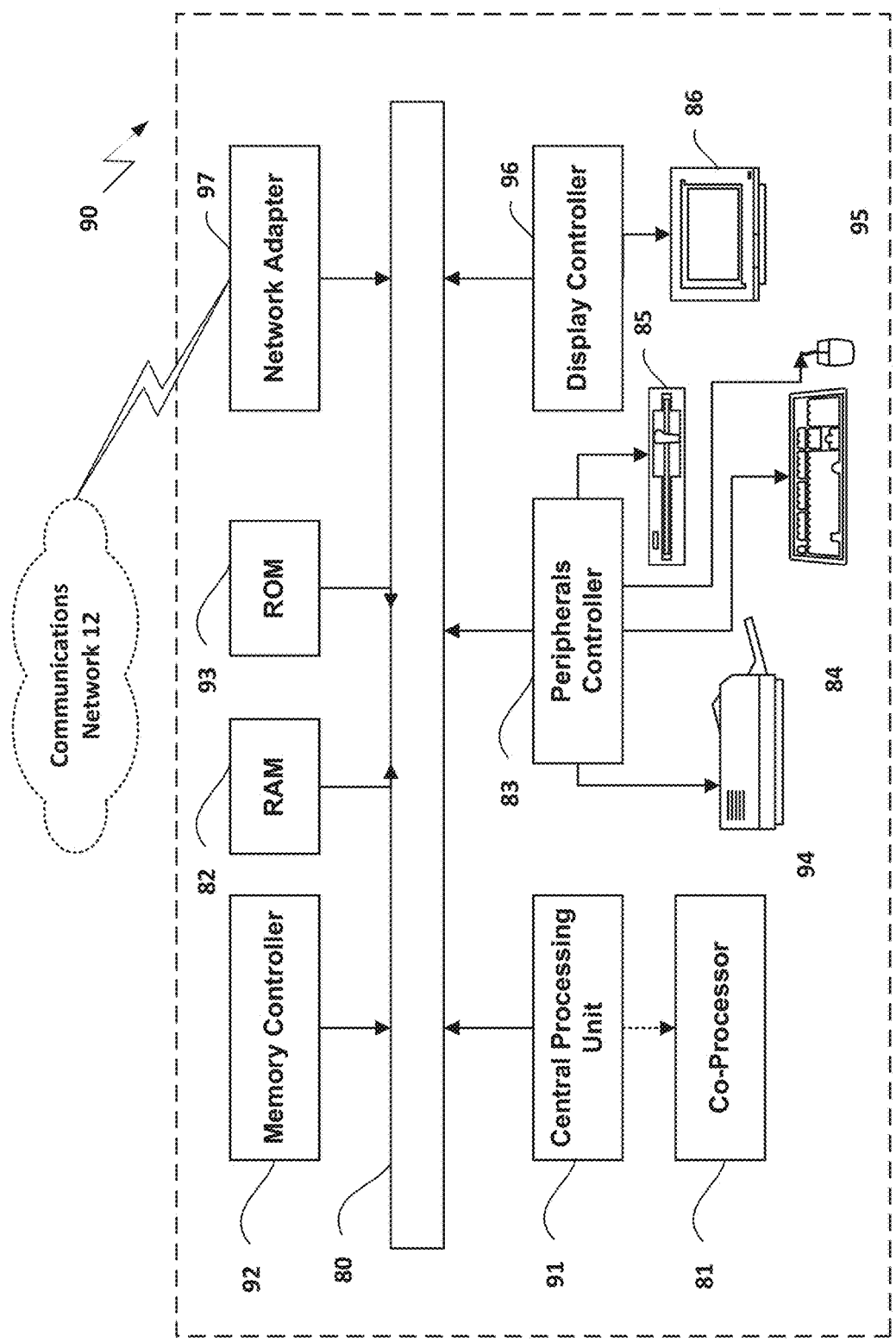
FIG. 25D is a block diagram of an example computing system in which a node of the communication system of FIGS. 25A and 25B may be embodied.

FIG. 25D is a block diagram of an exemplary computing system 90 which may also be used to implement one or more network apparatuses of a network, such as the entities illustrated in FIGS. 1, 4-15 and 19-23, and described herein, which may operate as an M2M server, gateway, device, or other network apparatus in an M2M network such as that illustrated in FIGS. 25A and 25B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 25 and its accompanying description.

Further, computing system 90 may contain communication circuitry, such as for example a network adaptor 97, that may be used to connect computing system 90 to an external communications network, such as network 12 of FIG. 25A-25D, to enable the computing system 90 to communicate with other apparatuses of the network. The communication circuitry, alone or in combination with the CPU 91, may be used to perform the transmitting and receiving steps described herein (e.g., in FIGS. 9-14 and 19-23) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus for a service supporting service capabilities through a set of Application Programming Interfaces (APIs), the service being provided as middleware between application protocols and a plurality of applications, the apparatus comprising a processor, a memory, and computer-executable instructions stored in the memory of the apparatus which, when executed by the processor of the apparatus, cause the apparatus to perform operations comprising:
   receiving a first request to create a new custom resource stored within a RESTful resource of the service, wherein the RESTful resource is a uniquely addressable element in a Resource Oriented Architecture (ROA) having a representation that can be manipulated via RESTful methods and wherein the new custom resource comprises one or more custom defined resource attributes, wherein the first request comprises a resource definition for defining the new custom resource;
   integrating the new custom resource into operations of the service;
   receiving a second request to create a data model mapping for the new custom resource, the data model mapping providing one or more uniform resource indicators (URIs) of interworked resources and retargeting indicators for indicating when to retarget a retrieve request targeting the interworked resources, the retargeting indicators comprising at least one of one-time retarget, always retarget, retarget on change, or periodic retarget; and
   creating the data model mapping for the new custom resource in the service.

2. The apparatus of claim 1, wherein the new custom resource is exposed for discovery by other entity via the service.

3. The apparatus of claim 1, wherein the middleware is a service layer for Internet of Things (IoT) services.

4. The apparatus of claim 3, wherein the service layer is defined according to ETSI/oneM2M standards.

5. The apparatus of claim 1, wherein the resource definition comprises at least one of information about inherited resource attributes, resource specific attributes, child resource attributes, or activation criteria.

6. The apparatus of claim 1, wherein the computer-executable instructions, when executed by the processor of the apparatus, further cause the apparatus to manage information at the service.

7. The apparatus of claim 6, wherein managing the information comprises at least one of retrieval, updating, removal, activation, and deactivation of the information at the service.

8. The apparatus of claim 7, wherein activating the information triggers an authorization check at the service to ensure that the requestor is authorized to request activation of the information.

9. The apparatus of claim 1, wherein the computer-executable instructions, when executed by the processor of the apparatus, further cause the apparatus to generate a response based on an evaluation of information at the service.

10. The apparatus of claim 6, wherein the information comprises a JSON definition associated with the new custom resource at a uniform resource indicator (URI).

11. A method for a service supporting service capabilities through a set of Application Programming Interfaces (APIs), the service being provided as middleware between application protocols and a plurality of applications, the method comprising:

receiving a first request to create a new custom resource stored within a RESTful resource of the service, wherein the RESTful resource is a uniquely addressable element in a Resource Oriented Architecture (ROA) having a representation that can be manipulated via RESTful methods and wherein the new custom resource comprises one or more custom defined resource attributes, wherein the first request comprises a resource definition for defining the new custom resource type;

integrating the new custom resource into operations of the service;

receiving a second request to create a data model mapping for the new custom resource, the data model mapping providing one or more uniform resource indicators (URIs) of interworked resources and retargeting indicators for indicating when to retarget a retrieve request targeting the interworked resources, the retargeting indicators comprising at least one of one-time retarget, always retarget, retarget on change, or periodic retarget; and creating the data model mapping for the new custom resource in the service.

12. The method of claim 11, wherein the new custom resource is exposed for discovery by other entity via the service.

13. The method of claim 11, wherein the middleware is a service layer for Internet of Things (IoT) services.

14. The method of claim 13, wherein the service layer is defined according to ETSI/oneM2M standards.

15. The method of claim 11, further comprising managing information at the service.

16. The method of claim 15, wherein the information comprises a JSON definition associated with the new custom resource at a uniform resource indicator (URI).

\* \* \* \* \*